(12) United States Patent
Perkins et al.

(10) Patent No.: US 8,824,460 B2
(45) Date of Patent: *Sep. 2, 2014

(54) IC GENERATING PACKETS CONTAINING DESTINATION, FIRST, AND SECOND PROXY ADDRESSES

(71) Applicant: Texas Instruments Incorporated, Dallas, TX (US)

(72) Inventors: Stephen J. Perkins, Dallas, TX (US); Alan Gatherer, Richardson, TX (US); Krishnasamy Anandakumar, San Diego, CA (US); Alan V. McCree, Ellicott City, MD (US); Vishu R. Viswanathan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,445

(22) Filed: Feb. 6, 2013

(65) Prior Publication Data

US 2013/0148651 A1 Jun. 13, 2013

Related U.S. Application Data

(62) Division of application No. 13/101,692, filed on May 5, 2011, now Pat. No. 8,396,058, which is a division of application No. 12/638,578, filed on Dec. 15, 2009, now Pat. No. 7,961,758, which is a division of application No. 11/175,411, filed on Jul. 6, 2005, now Pat. No. 7,693,062, which is a division of application No. 10/320,205, filed on Dec. 16, 2002, now Pat. No. 6,930,983, which is a division of application No. 09/552,090, filed on Apr. 19, 2000, now Pat. No. 6,496,477, which is a division of application No. 09/551,793, filed on Apr. 18, 2000, now abandoned, which is a division of application No. 09/526,270, filed on Mar. 15, 2000, now abandoned.

(60) Provisional application No. 60/145,848, filed on Jul. 9, 1999.

(51) Int. Cl.
| | |
|---|---|
| *H04L 12/66* | (2006.01) |
| *H04L 29/14* | (2006.01) |
| *H04L 29/06* | (2006.01) |
| *H04L 12/56* | (2006.01) |
| *H04W 88/14* | (2009.01) |
| *H04L 12/24* | (2006.01) |
| *H04W 40/24* | (2009.01) |
| *H04W 40/02* | (2009.01) |
| *H04W 84/04* | (2009.01) |
| *H04W 40/20* | (2009.01) |
| *H04W 88/08* | (2009.01) |
| *H04W 88/16* | (2009.01) |
| *H04W 28/04* | (2009.01) |

(52) U.S. Cl.
CPC ............... *H04L 45/56* (2013.01); *H04W 88/14* (2013.01); *H04L 41/024* (2013.01); *H04W 40/246* (2013.01); *H04L 69/40* (2013.01); *H04L 41/0206* (2013.01); *H04L 65/4076* (2013.01); *H04W 40/02* (2013.01); *H04L 65/605* (2013.01); *H04W 84/042* (2013.01); *H04L 45/00* (2013.01); *H04L 29/06027* (2013.01); *H04L 45/24* (2013.01); *H04L 65/80* (2013.01); *H04L 65/602* (2013.01); *H04W 40/20* (2013.01); *H04W 88/08* (2013.01); *H04W 88/16* (2013.01); *H04L 47/2416* (2013.01); *H04W 28/04* (2013.01); *H04L 65/105* (2013.01)
USPC .......................................... 370/352; 370/389

(58) Field of Classification Search
None
See application file for complete search history.

(56) References Cited

U.S. PATENT DOCUMENTS

| | | | |
|---|---|---|---|
| 5,621,800 A * | 4/1997 | Weng et al. | 380/266 |
| 6,510,172 B1 * | 1/2003 | Miller | 375/140 |
| 7,693,062 B2 * | 4/2010 | Perkins et al. | 370/235 |
| 8,396,058 B2 * | 3/2013 | Perkins et al. | 370/352 |

* cited by examiner

*Primary Examiner* — David Oveissi

(74) *Attorney, Agent, or Firm* — Lawrence J. Bassuk; Frederick J. Telecky, Jr.

(57) ABSTRACT

In one form of the invention, a process of sending real-time information from a sender computer (103) to a receiver computer (105) coupled to the sender computer (103) by a packet network (100) wherein packets (111,113) sometimes become lost, includes steps of directing (441) packets (111) containing the real-time information from the sender computer (103) by at least one path (119) in the packet network (100) to the receiver computer (105), and directing packets (113) containing information dependent on the real-time information from the sender computer (103) by at least one path diversity path (117) in the packet network (100) to the same receiver computer (105). Other forms of the invention encompass other processes, improved packets and packet ensembles (111,113), integrated circuits (610), chipsets (DSP 1721, MCU), computer cards (1651), information storage articles (1511,1611), systems, computers (103,105), gateways (191, 193), routers (131,133), cellular telephone handsets (181, 189), wireless base stations (183,187), appliances (1721,1731,1741), and packet networks (100), and other forms as disclosed and claimed.

9 Claims, 14 Drawing Sheets

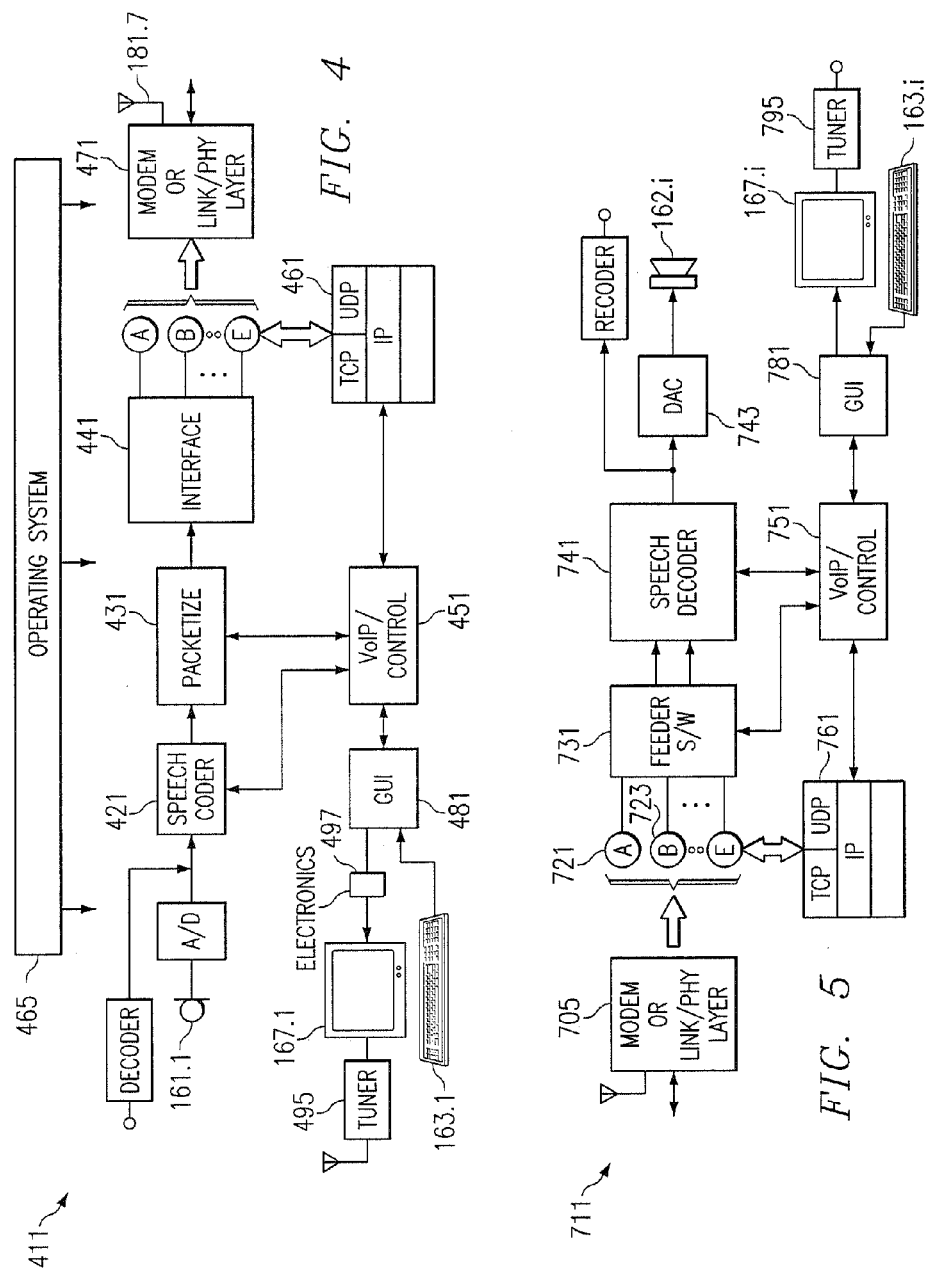

| PROXY ADDRESS | PROXY ID | REGION | LOCATION | PROVIDER | ⋮ | COS |
|---|---|---|---|---|---|---|
| ADRHZ | 11011100 | 5 | $(x_1, y_1)$ | a | | A |
| ADRQE | 11011101 | 2 | $(x_2, y_2)$ | p | | C |
| ADRSK | 11011102 | 7 | $(x_3, y_3)$ | h | | B |
| | | | | | | |

POSITION OF PROXIES AND CORRELATION

|   | A | B | C | D | E | F | ... |
|---|---|---|---|---|---|---|---|
| A | 0 | 50 | 1000 | 28 | 500 | | |
| B |   | 0 | | | | | |
| C |   | 80 | 0 | | | | |
| D |   | 500 | | 0 | | | |
| E |   | 125 | | | 0 | | |
| F |   | | | | | 0 | |
| ⋮ | | | | | | | |

US 8,824,460 B2

IC GENERATING PACKETS CONTAINING DESTINATION, FIRST, AND SECOND PROXY ADDRESSES

This application is a divisional of prior application Ser. No. 13/101,692, filed May 5, 2011, now U.S. Pat. No. 8,396,058, issued Mar., 12, 2013;

Which is a divisional of application Ser. No. 12/638,578, filed Dec. 15, 2009, now U.S. Pat. No. 7,961,758, issued Jun. 14, 2011;

Which is a divisional of application Ser. No. 11/175,411, filed Jul. 6, 2005, now U.S. Pat. No. 7,693,062, granted Apr. 6, 2010;

Which is a division of application Ser. No. 10/320,205, filed Dec. 16, 2002, now U.S. Pat. No. 6,930,983, granted Aug. 16, 2005;

which was a division of application Ser. No. 09/552,090, filed Apr. 19, 2000, now U.S. Pat. No. 6,496,477, granted Dec. 17, 2002;

which was a divisional of application Ser. No. 09/551,793, filed Apr. 18, 2000, now abandoned;

which was a divisional of application Ser. No. 09/526,270, filed Mar. 15, 2000, now abandoned;

which claims priority from Provisional Application No. 60/145,848, filed Jul. 9, 1999.

This application incorporates application Ser. No. 09/461,155, filed Dec. 14, 1999, now U.S. Pat. No. 6,757,256 (TI-28906).

FIELD OF THE INVENTION

This invention relates to the electronics field of remote access and networking. The invention is implemented in numerous different embodiments in integrated circuits, chipsets, printed circuit cards, computers, networks, servers, routers, telephone handsets, base stations, gateways, and PBXs, as well as methods and processes of manufacture and operation of each of the foregoing, and improved packets and packet ensembles.

BACKGROUND OF THE INVENTION

Communication through the Internet is based on the Internet Protocol (IP). The Internet is a packet-switched network versus the more traditional circuit switched voice network. The routing decision regarding an IP packet's next hop is made on a hop-by-hop basis. The full path followed by a packet is usually unknown to the transmitter, but it can be determined after the fact.

Packet loss over the Internet has been shown to be highly correlated. If packet N is dropped, there is a high probability that packet N+1 will also be dropped. Kostas, Borella, et al. "Real-Time voice over Packet-Switched Networks," IEEE Network, January/February 1998.

Voice over Packet/Voice over IP (VOP/VOIP) solutions contend with bandwidth, delay jitter, delay, and packet loss issues. Voice codecs provide some form of packet loss-concealment, or packet loss mitigation, by utilizing coding and packetization schemes over a single flow. These schemes employ some combination of buffering and redundancy (forward error correction (FEC), multi-rate encoding, etc.). The redundant portion of the coding is inserted into some other packet in the single flow. Such coding provides an intra/inter packet diversity gain that can help conceal packet loss, delay, and delay jitter.

TCP is a transport layer 4 protocol and IP is a network layer 3 protocol. IP is unreliable in the sense that it does not guarantee that a sent packet will reach its destination. TCP is provided on top of IP to guarantee packet delivery by tagging each packet. Lost or out of order packets are detected and then the source supplies a responsive retransmission of the packet to destination. Because the packet retransmission process takes significant time, TCP may not satisfactorily solve problems in quality transmission of audio, also known as Voice over IP or VOP (Voice over Packet), and video and other media where maximum tolerable packet delay is not high.

UDP is a transport layer 4 protocol that eliminates the overhead of the retransmission mechanism of TCP but does not make a guarantee that every sent packet will be received. The interface to command the use of either UDP or TCP is very similar.

DIFFSERV is a class of service initiative spearheaded by the IETF Internet Engineering Task Force. Class A service will be better than Class B and Class B is better than Class C. IETF has tried to improve QoS (quality of service). QoS categories are mapped by a policy mechanism to the DIFFSERV class of service categories. However, the policies of different subnetworks (domains) of different companies do vary. As a packet traverses the Internet it typically crosses various companies' domains. These companies require and need to track payment for various classes of services, so permission and authentication mechanisms are keyed to the various service policies of the companies.

RSVP is an edge-network protocol which requires that every intermediate router understand RSVP. Over long distances typical of the Internet this condition does not usually pertain. RSVP is utilized in enterprise networks.

SUMMARY OF THE INVENTION

In one form of the invention, a process of sending real-time information from a sender computer to a receiver computer coupled to the sender computer by a packet network wherein packets sometimes become lost, includes steps of directing packets containing the real-time information from the sender computer by at least one path in the packet network to the receiver computer, and directing packets containing information dependent on the real-time information from the sender computer by at least one path—diversity path in the packet network to the same receiver computer.

Other forms of the invention encompass other processes, improved packets and packet ensembles, integrated circuits, chipsets, computer add-in cards, information storage articles, systems, computers, gateways, routers, cellular telephone handsets, wireless base stations, appliances, and packet networks, and other forms as claimed.

BRIEF DESCRIPTION OF THE DRAWINGS

FIG. 4 is a partially-block and partially-process diagram of a sending software embodiment of the invention for installation in an improved workstation, personal computer, notebook computer, palmtop computer, computer card, VoIP cellular telephone, and other computer embodiments of the invention;

FIG. 5 is a partially-block and partially-process diagram of a receiving software embodiment of the invention for installation in an improved workstation, personal computer, notebook computer, palmtop computer, computer card, VoIP cellular telephone, and other computer embodiments of the invention;

DETAILED DESCRIPTION OF PREFERRED EMBODIMENTS

Figure 1:
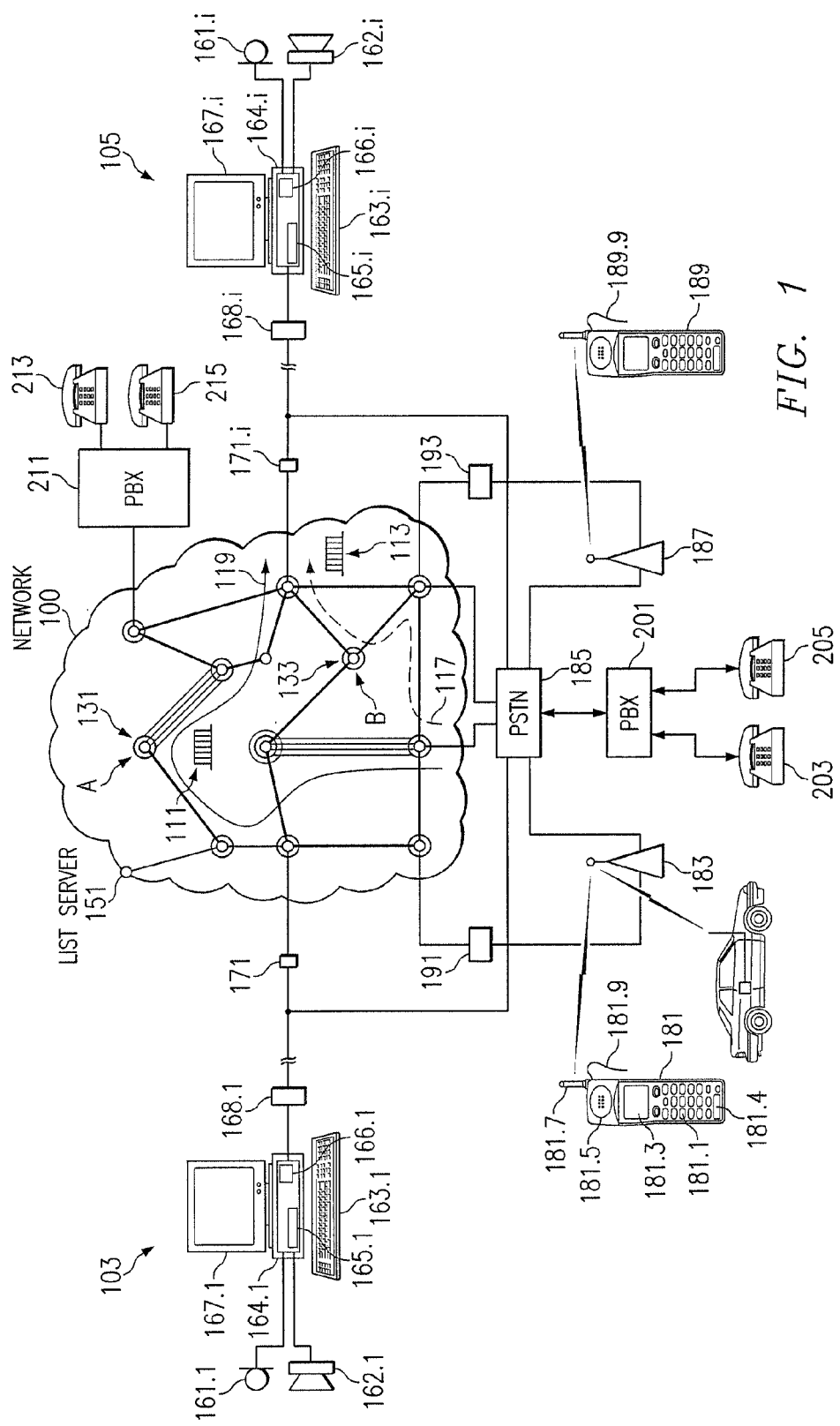
FIG. 1 is a block diagram of an improved network embodiment of the invention together with improved computers, gateways, cellular telephones and cellular base stations of various embodiments of the invention.

Packet loss is ameliorated and delay jitter is mitigated in Voice over Packet and/or Voice over Internet Protocol applications in various embodiments by using multiple independent paths for datagram flows. Multiple paths reduce the correlation of packet loss, delay, and delay jitter. Various embodiments avoid some congestion areas by routing through multiple independent paths, thus mitigating some of the packet loss and delay jitter that would be experienced by conventional methods and conventional apparatus using only a single path. Various path-diversity solutions described herein can be used in conjunction with many of the existing techniques that attempt to deal with packet loss and delay jitter. The path-diversity solutions herein provide an additional "gain" due to the less correlated multiple paths. This gain is similar in some ways and different in others from the multipath gain in wireless. Path diversity keeps QoS high. A command or trigger mechanism initiates path diversity in some embodiments.

This document describes embodiments and approaches that introduce path diversity into VOP/VOIP and other media applications. Providing multiple paths between a single source and destination confers a path diversity gain that can be leveraged by codecs. Extensions are discussed that cover class of service (CoS) and quality of service (QoS) on the paths.

Flow Path Diversity: In some inventive embodiments VOP/VOIP applications open multiple (two or more) flows between the same source and the destination. The packets in each flow traverse separate paths from packets in other flows (for at least some of the hops between the source and destination). Having multiple paths reduces the correlation of packet loss, delay, delay jitter, etc. over the Internet and other networks. New codecs can take advantage of the extra gain provided by path diversity while still employing intra/inter packet diversity techniques. For example, one can leverage the work done with path diversity in the wireless arena.

How To Achieve Flow Diversity: Currently there is little work done in path selection for flows. The Internet Engineering Task Force (IETF) has worked on a physical topology management information base (MIB) for the Simple Network Management Protocol (SNMP). The Internet does not support path selection very well either. IP has the concept of source routing, but this feature is limited and purposely not supported in many instances due to perceived risks to network security.

A few mechanisms that may be used by herein improved processes to achieve flow diversity are nonexhaustively listed next.

Resource Reservation Setup Protocol (RSVP). Use some protocol to reserve resources through multiple paths. How these paths are discovered is discussed later herein. Since RSVP guarantees quality of service already, it is not a primary locus, though it is a possible one, for application of the path diversity approach proposed here. Path diversity as proposed is not incompatible with RSVP. Path diversity with any protocol can be implemented as contemplated herein even when QoS is high so that the path diversity is already available when QoS declines or is low. In other embodiments path diversity is initiated when QoS has declined below a particular level.

Source Routing is currently supported but limited due to hop count and security issues. How paths are discovered is discussed later herein.

Fixed intermediate gateway. Auxiliary flows in this approach go through fixed intermediate hosts that are designed to forward the paths to the destination. A large physical separation distance of the intermediate host from the final destination host advantageously provides path diversity using the standard Internet routing procedures.

Multiple backbones. Large Internet Service Providers (ISPs) are typically connected to redundant links connected to different network backbones. These links and physical interfaces exhibit path diversity which can be advantageously put to use as described herein.

Thus, an important conception herein proposes to take advantage of path diversity, and path diversity may be achieved by a variety of embodiments.

Extensions: When multiple classes of service are available, embodiments can be optimized for quality, price, etc. A class of service (COS) architecture (e.g., DIFFSERV) offers multiple paths where each employs a different class of service. A quality of service (QOS) architecture (e.g., RSVP or ATM, Asynchronous Transfer Mode), offers multiple paths where each employs a different guaranteed quality of service. Embodiments of the invention can be used to make DIFF-SERV work better, wherein only classes of service exist, to provide a satisfactory QoS by permitting the destination to reconstruct lost packets, especially in VoIP and VOP.

In wireless, diversity of reception at multiple antennas, or by bouncing off multiple reflecting objects thereby creating multiple paths, at an analog level provides diversity gain. In contrast, the discussion herein importantly focuses on digital network path diversity in packet networks. At the transport layer level of a packet network, the path which will be taken is unknown or less certainly known, and diversity as contemplated herein is a diversity of digital paths for digital packets via diverse nodes or servers. A cell phone embodiment can, however, be arranged to access the Internet or other large packet network connected to the cell phone base station, wherein the cell phone communicates to its destination by multiple digital paths in the packet network. A type of cell phone base station is improved to initiate the packet network path diversity instead of the cell phone.

For an embodiment to be useful, it need not be adjacent to a wire-line network and indeed can be communicating over the Internet or other large network with intermediate wireless links. The packets may encounter satellite, microwave, cable, optic fiber, cellular, and numerous other types of network communications links. In some embodiments the diversity occurs anywhere at any point within the wire-line network and is not restricted to the endpoints.

In another embodiment a personal computer (PC) 103 (FIG. 1) or workstation is improved for network path diversity and is directly connected to the public switched telephone network (PSTN) 185 through which the PC 103 or workstation communicates to the Internet 100, for example. The choice of modem or means of connection of the computer to the network is suitably any of voice-band (e.g., V.90), cable, LMDS, DSL, Ethernet, wireless, satellite, etc. Software improvement is suitably made at the transport layer (Layer 4) or network layer (Layer 3) or in any event at a network layer of abstraction above the link layer (Layer 2) and physical (PHY) layer (also called Layer 1) at which the selection of modem resides.

Going further in a spatial dimension, the embodiments suitably reside in a PC, a cell phone, a base station, in a server in the Internet backbone and elsewhere. Path diversity thus establishes a way to communicate duplicated or otherwise dependent packets through the Internet "cloud" by multiple paths or routes.

Edge devices outside the cloud or routers inside the cloud suitably implement the improvement of path diversity. The multiple paths between the devices yield a communications improvement, regarded as a "gain," between the edge devices. If there is a congested link and the path diversity covers or steers packets around it, then the introduction of path diversity will be beneficial.

The improvement advantageously can be implemented at multiple points at the edge and within the network without interfering with itself, bearing in mind that path diversity does increase the amount of data that is being sent over the network at a given rate. In a worst case the increased amount of data might add to network congestion, and thus exacerbate the congestion problem which the path diversity improvement is intended to ameliorate. Thus, the skilled worker suitably utilizes embodiments and transport network protocols which do not exacerbate network loading if this turns out to be an issue.

Transmitting in time with time-diversity involves sending data and then sending it again, except that VoIP is sensitive to the latency or delay. Interleavers are also used to obtain a QoS improvement not by time diversity but by interleaving (or shuffling) coded speech frames over a number of packets. Advantageously and by contrast, packet network path diversity herein spreads out space instead of time by using multiple paths and reduces and minimizes the latency problem.

FIG. 1 shows a network cloud 100 coupling computers 103 and 105. If one path from a source 103 is intermittent, then another path is made to be present so that packets can get to the destination 105. The source 103 inventively launches packets and their dependent packets as plural flows along plural paths 117 and 119 through network 100. Advantageously, one modem at source 103 can support the plural flows or streams. In the Internet the path that a given packet will take cannot usually be predicted, and various packets will take different routes due to the fault-tolerant, multiple-path nature of the Internet. A PC or workstation is provided at destination 105 to receive the first and second flows or streams of data from the intermediate nodes 131 and 133.

Some of the method and apparatus embodiments guarantee or at least make probable that the distinct streams of packets 111 and their dependent packets 113 will traverse different routes 119 and 117 through the network 100 from source 103 to destination 105. Then a further aspect of method and apparatus at the destination 105 determines whether a given packet is lost and then uses the information in a corresponding dependent packet to reconstruct the lost packet or to construct a semblance of the lost packet depending on an estimate of the information that was lost.

A balance, or optimization, is involved in operation. If temporal-diversity packets are too far apart in time, they are too far apart for audio VoIP purposes. If the packets are too close in time the temporally-diverse packets may take the same physical route from source to destination. Heretofore there has been no mechanism for finding two different paths ahead of time for a packet and at least one dependent packet, and then constraining them to take the two different paths respectively, or at least constrain them to pass through two different specified routers A and B on their way to the destination.

By contrast with wireless path diversity, the Internet is a set of digital packet "antennas" that are being issued by a genie, and some process is needed to assure that they will be far enough apart to achieve diversity gain.

Further in FIG. 1, personal computer 103 has a microphone 161.1, a loudspeaker (and/or headphones or other audio transducer) 162.1, a keyboard (and/or mouse or other touch-sensitive input device) 163.1, a computer box 164.1 including one or more information storage devices 165.1 and a printed wiring board 166.1 with microprocessor(s), digital signal processor(s), volatile memory, peripheral chipset and peripherals. Associated with computer box 164.1 is a cathode ray tube monitor (and/or liquid crystal display, and/or digital light processor (DLP) and/or other display device and/or printer) 167.1 coupled to printed wiring board 166.1. Other peripherals (not shown) such as videoconferencing camera, digital still camera, optical scanner, wire/power-line/cable/fiber networking interfaces, wireless networking interface and other devices now available or yet to be devised are also coupled to printed wiring board 166.1. A modem 168.1 is also coupled to printed wiring board 161.1. The modem is suitably V.90 voice-band modem, cable modem, DSL (digital subscriber line modem), ISDN (Integrated Services Digital Network) or other suitable modem. The modem 168.1 couples personal computer 103 to a packet network gateway computer 171 as well as to a public switched telephone network PSTN 185.

A similar description applies to various components associated with computer 105 of FIG. 1, and reference numerals with a suffix ".i" have like description of corresponding reference numerals already described in connection with personal computer 103. Also the suffix ".i" indicates that computer 105 is one of many computers coupled to packet network 100 and or via PSTN 185 to a gateway to network 100.

Further in FIG. 1, a cell phone 181 typifies numerous cell phones active in a cell of a cellular telephone base station 183. Cell phone 181 has an enclosure with a manual input (or touch pad or button pad or keyboard) 181.1, a microphone 181.4, an audio output transducer such as a loudspeaker 181.5, a visual interface 181.3 such as an LCD screen, and a wireless antenna 181.7. Inside of cellular telephone 181 is electronics coupled to the aforementioned components, and the electronics includes an analog section coupling the microphone 181.4 and speaker 181.5 to a TMS320C54xx DSP from Texas Instruments Incorporated and a microcontroller such as an ARM™ chip licensed by Advanced RISC Machines. The microcontroller is also coupled to the manual input 181.1 and visual interface 181.3. Further, the microcontroller is coupled with the digital signal processor. A radio frequency RF section couples the other sections and chips to the antenna 181.7 for two-way and multi-way communications.

Base stations 183 and 187 are coupled to a public switched telephone network PSTN 185, which in turn is coupled to the packet network 100. Also, base stations 183 and 187 are respectively coupled to packet network 100 via gateways 191 and 193. In the cell served by base station 187, a cell phone 189 typifies numerous cell phones active in a cell service area of that base station 187.

A private branch exchange PBX 201 couples telephones 203 and 205 to PSTN 185. Suitably, PBX 201 is improved for path diversity communications as described herein. Another PBX 211 couples IP phones 213 and 215 to a node of packet network 100 as illustrated.

Figure 2:
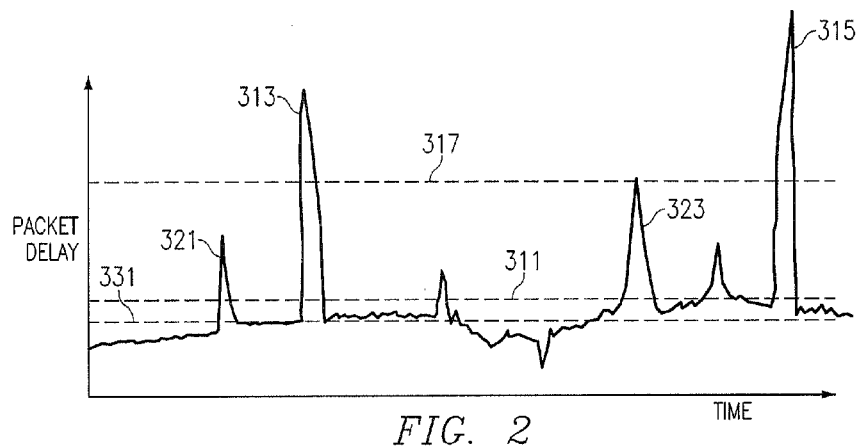
FIG. 2 is a graph of packet delay versus packet number demonstrating one type of behavior of conventional communications over the Internet.

FIG. 2 illustrates packet delay vs. packet number obtained in measurements in this work. The Internet is used blindly in sending out packets. The data shows a relatively low amount of delay below an average delay level 311, but every so often the system experiences instances of momentous delay shown as peaks 313 and 315 which rise above a maximum tolerable delay level 317 for the application (e.g., VoIP) in question. Peaks 313 and 315 represent logjams, or packet loss due to pointwise or nodal congestion, but these logjams are usually quite localized spatially or geographically across the country. Absent portions in FIG. 2 near peaks 313, 315 and 325 represent unreceived lost packets. Still other peaks 321 and 323 occur but exist manageably below the level 317. A noise floor delay 331 represents a median delay observed for the packets in the tests.

Bandwidth is not a big concern for most Internet users, regardless of the significance of that metric for network planners and administrators. Rather indeed, data will represent the vast majority, perhaps 90%, of the traffic on the Internet. Thus, voice will be a sliver of the traffic and increasing the bandwidth demanded by voice by implementing path diversity according to various embodiments is not believed to be a major concern.

Secondly, various embodiments become increasingly attractive because of the development of ever more sophisticated speech coders which provide high compression, good voice quality, and low bit rates which conserve network resources that are made ever more available.

But delay and delay jitter are problems in networks such as the Internet and other packet networks, which problems can be solved by using a minor amount of packet network resources according to path diversity embodiments herein.

Figure 3:
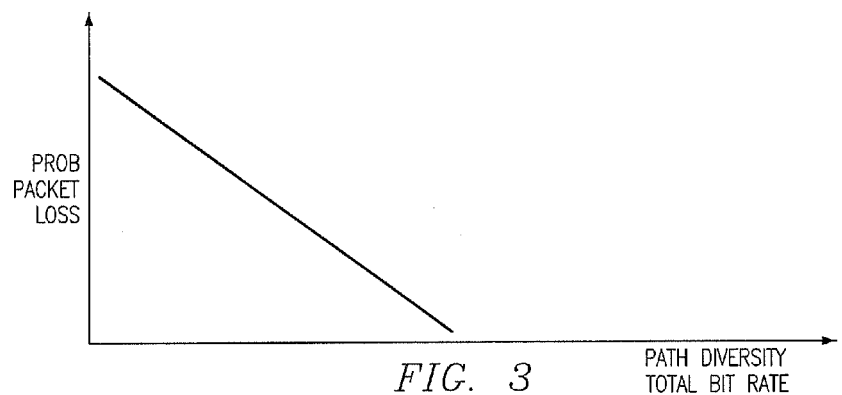
FIG. 3 is a graph of packet loss probability versus path diversity total bit rate in a packet network such as the Internet, the graph illustrating communications improvement according to a process of the invention.

FIG. 3 illustrates that the probability of packet loss goes down as path diversity total bit rate goes up. Probability of packet loss is estimated from the ratio of number of packets subject to momentous spikes of delay 313 and 315 in FIG. 2 and/or actual loss in the network to the total number of packets being sent. Thus, implementation of some inventive embodiments herein increases path diversity bit rate by generating dependent packets and sending them to one or more path-diverse intermediate nodes. DSL (digital subscriber line wideband phone line modem) and cable and other modems offer an enormous bandwidth linking the user premises to the Internet. This enormous bandwidth readily accommodates a voice call inventively implemented herein with its bit rate or bandwidth increased due to generation of dependent packets as disclosed according to some of the inventive embodiments.

When the Internet backbone is loaded, and the future addition of more VoIP calls is added to that load, the QoS for many of those VoIP calls may become degraded below acceptability level 317 for many users. Accordingly, addition of path diversity according to various embodiments of apparatus and methods herein, is likely to be not merely desirable but necessary for VoIP, VoP and media over packet to be acceptable for those users experiencing congestion. And since VoIP is a sliver of the Internet load, rescuing QoS for a far larger fraction of VoIP calls than the incremental fraction of bandwidth proposed to be added herein easily justifies transmitting path diverse dependent VoIP/VoP/media packets.

Note that the media over packet signal is spread out over a spatial dimension, and some embodiments dynamically cause the signal to transmitted with only as much diversity as is needed at any given time to get the QoS job done, see incorporated U.S. Pat. No. 6,757,256.

In a first example, duplicate data streams are programmed or constrained to flow over two different paths. In a routing decision at the source 103, a process embodiment identifies and transmits two different streams. A proxy application runs on a server A called a forwarder. Respective forwarders A and B at the intermediate nodes 131 and 133 forward the two different streams to the destination 105. Thus, source 103 sends a first data stream to forwarder A at node 131, and forwarder A is programmed to forward the first data stream on to destination 105. Source 103 also or concurrently sends a second data stream having dependent packets, dependent relative to packets in the first data stream, to forwarder B at node 133, and forwarder B is programmed to forward the second data stream on to the same destination 105.

The software in the first PC at source 103 opens two different Internet Protocol streams to the forwarders A and B and sends to forwarders A and B the final destination identification. Thus, software of an inventive embodiment is located on the forwarders. Skilled workers or companies working to encourage the proliferation of VoIP/VoP/media over packet can also set up and publicize dedicated forwarder servers endowed with the proxy forwarding software.

A source route embodiment is discussed next which employs no additional proxy forwarding software at the servers at intermediate nodes 133 and 135. Since some firewalls do not permit source-routing, this embodiment is well suited to those home, small-office, home-office, and small-business environments having no firewall. Also, even firewalls can be programmed to let low risk VoIP calls having source-routed datagrams through. Improved software or add-in cards useable out of the box can be implemented for PCs or sold in new PCs. The skilled worker inquires and obtains from Internet Service Providers certain source routing information identifying their servers to incorporate into and thereby improve the PC software as contemplated in this second embodiment. This source routing information specifies various intermediate nodes to use as the path diversity intermediate nodes to which the PC in which the software is installed can send VoIP dependent streams of packets. The skilled worker(s) or companies working to encourage the proliferation of VoIP can also set up the intermediate nodes and publicize the source routing information for these servers. Also, the skilled worker suitably additionally sets up one or more web sites having the forwarding or source routing information. The improved PC software in the set up process accesses the web site(s) and downloads the forwarding or source routing information of the forwarders or path diversity intermediate nodes. A company suitably differentiates itself by providing at least some servers which permit source routing by not being conventionally deliberately programmed to block source routing.

An application level modification procedure is described next for modifying conventional VoIP application software (including a speech codec) to provide a VoIP application embodiment. The VoIP application embodiment of FIGS. 4 and 5 is suitably manufactured and sold as part of an operating system on media for sale, as part of an operating system loaded into storage on a computer box wherein the computer box is for sale, or sold as an application by a third-party ISV independent software vendor, or stored in non-volatile memory of one or more integrated circuits which are sold as integrated circuits, or as a printed wiring board stuffed with said integrated circuits or as an embedded application box or computer box any of which is a product.

Sending Software

In FIG. 4 a software and system embodiment 411 includes a speech coder 421 and an Internet Protocol (IP) stack 461, and an improved interface 441. A standard "Sockets" interface on the IP stack, which is commercially available with the Microsoft® Windows® operating system for example, responds to a command to open a connection to an intermediate node such as 133. Use the IP stack 461, open a connection and send data. Write the VoIP application to have routing code added to "Sockets" in interface 441 that opens multiple path diversity connections and takes the packets from the speech coder 421 and farms out or distributes packets and dependent packets over the multiple path diversity connections. Provide a list 521 of intermediate nodes and their respective source routing data. Select at least two intermediate nodes such as to provide path diversity. Command the IP stack firstly to open a connection to the first intermediate node. Command the IP stack secondly to open a connection to the second intermediate node. The path-diversity improved interface block 441 together with the UDP/IP part of block 461 is one example of a "packet network path diversity software stack" for purposes herein.

Provide commands in the speech codec 421 software to produce compression frames and dependent compression data for packetizing by a packetize block 431. This is an example of providing some statistical dependency either as simple replication (repetition coding) of packets, moderate redundancy, all the way to very sophisticated statistical redundancy.

Two or more mutually-dependent packets can be generated such that one packet has the full information that is intended to be transmitted, and one or more additional packets have less than or equal to that full information in the first packet. Alternatively, the packets are suitably generated such that none of the packets have the full information intended for reception, and instead each of the packets has less than that full information, and the packets which are received (even if some be lost) then have their information combined in the decoder to obtain what information is available in them collectively. If only one packet reaches the destination out of the mutually dependent packets sent, then the partial information in that packet is decoded by a decoder 741 of FIG. 5 to obtain a result that is significantly better than nothing at all.

Other arrangements wherein information is convolved or overlapped over several packets are contemplated. Advantageously, many inventive embodiments that select and mix-and-match various coding and decoding techniques are contemplated to fulfill the needs of particular system economics, class of service CoS, quality of service QoS, speed, bandwidth, cost, power consumption and other variables influencing particular systems designed by the skilled worker.

Speech coder 421 supplies packets of coded compressed speech which interestingly contain some critical bits which are essential to receive and other less critical bits the non-reception of which degrades the decoded result more gracefully. In one path diversity coding embodiment, the critical bits are indeed exactly replicated, or copied, and sent in two or more packets along diverse paths. In another path diversity embodiment the dependent packets are sent using high compression encoding in the one or more additional packets of the set. In this way, various kinds of coding are advantageously contemplated, including joint coding, so that path diversity packets can be sent in a manner which significantly less-than-doubles the network loading of the VoIP or VoP transmission.

Improved software code in interface 441 (see FIG. 18) tells the IP stack 461 to open multiple connections and send streams down them respectively. Routing is done in the IP layer of block 461 in one example embodiment. Open two connections in circles A, B, etc., to cause two different routes to be taken by the dependent packets. Add information which defines corresponding intermediate machines at intermediate nodes 131 and 133, but which does not define (and does not need to define) each path from source 103 to either intermediate machine A or B, nor defines each path from either machine A or B to the destination 105.

In one example, the source 103 has improved software of FIGS. 4 and 5 loaded into it and establishes a process of sending below-tabulated packets 601, 603, 605, etc. to machine A and destination 105 of FIG. 1. The process further includes sending dependent packets 601', 603', 605', etc.

routed to machine B and destination 105. The speech coder 421 in source 103 has its output multiplexed, i.e., alternately switched by the process, to connection software, launched twice and with respective operations connecting and sending packet 601 to machine A, sending packet 601' to machine B, then sending packet 603 to machine A and packet 603' to machine B, then sending packet 605 to machine A and packet 605' to machine B, etc. In this way the dependent packets 601, 601' are transmitted concurrently or at least relatively close in time over diverse packet network paths so that they can be received with relatively little delay between them. The packet numerals are in the Packet Transmission Table and not in the drawings.

Among various process alternatives are 1) for coder 421 generation: generate packets consecutively, or instead generate packets in parallel concurrently or substantially simultaneously; 2) interface 441: alternate or commutate the packets to supply them to multiple connection software objects A,B staggered in time, or instead supply the dependent packets concurrently to the multiple connection software objects; 3) connection software objects A,B: multiple modules, or instead a single module that takes consecutive packets and is configured to route to A, then route to B, then route to A, then route to B, etc.

A Packet Transmission Table representation shows still further alternatives.

over the network (two or more paths). The operating system, such as Windows, Linux, Unix or any other suitable operating system of which many such currently exist or will be in the future be developed, includes a network stack 461 which is a software module that establishes a process for opening each channel or path over which to send communications. The network stack, one common form of which is an Internet Protocol (IP) software stack, comes with the widely commercially available Windows operating system for example, and also in computers that are described as Internet-enabled. Then any application can use that stack. Applications such as Netscape, Internet Explorer, Mail, and others that communicate to the Internet use such an interface. Any application that sends and receives packets or otherwise communicates via Internet Protocol or TCP/IP uses this type of stack and unimproved interface to open a channel.

The network stack 461 is commanded herein to open multiple network connections automatically by some of the processes contemplated herein. Network stack software is capable of opening more than one path provided it is commanded to do so, and various embodiments of process, method and apparatus described herein recognize the advantages of doing so and do contemplate commands to the network stack to open path-diversity connections to the network.

The skilled worker as a VoIP designer specifies routes such as by identifying known intermediate machines A and B and

PACKET TRANSMISSION TABLE

| Packet and Path to: Dest. 105 Via | A | B | C | D | E, etc |
|---|---|---|---|---|---|
| Prior art 601, 603, 605, . . . | N/A | N/A | N/A | N/A | N/A |
| Embodiment | | | | | |
| 1 (repetition, two proxy) | 601, 603, etc | 601, 603, etc | N/A | N/A | N/A |
| 1A (two proxy) | 601, 603, etc | 601', 603', etc | N/A | N/A | N/A |
| 1B(path switching) | 601, x, 605, x, 609 | x, 603, x, 607, x | N/A | N/A | N/A |
| 2 (2-proxy) (alternation) | 601, 603', 605, 607' | 601', 603, 605', 607 | N/A | N/A | N/A |
| 3 (3-proxy) | 601, 603, etc | 601', 603', etc | 601'', 603'', etc | N/A | N/A |
| 4 (3-proxy) | 601', 603', etc | 601'', 603'', etc | 601''', 603''', etc | N/A | N/A |
| 5 (cycles, 3-proxy) | 601, 603', 605'' | 601', 603'', 605 | 601'', 603, 605' | N/A | N/A |
| 6 (3-proxy stagger) | 601, 603, 605, 607 | 601', x, 605', x | x, 603', x, 607', x | N/A | N/A |
| 7 (cycles, 3-proxy stagger) | 601, 603, 605', 607' | 601', x, 605, x | x, 603', x, 607, x | N/A | N/A |
| 8 (4-proxy stagger) | 601, 603, 605, 607, 609, 611 | 601', x, x, 607', x, x | x, 603', x, x, 609', x | x, x, 605', x, x, 611' | N/A |

9 etc., etc. permutations of predetermined assignments to paths
10 601, 603, 605, 607, 609, 611 . . . Randomly varying assignments to respective paths A, B, . . .
11 etc., etc. Permutations of pretermined assignments to some paths and randomly varying assignments to other paths Table Notes:
The table entries illustrate transmission at substantially corresponding times for corresponding sequence positions of numerals.
The entry "x" means no transmission relevant to the particular 600-series in a particular time interval in the order tabulated.
A primed numeral signifies a packet with dependent data having dependent information content and less information content than a packet signified by the same numeral but unprimed. A multiply-primed numeral is the same, but implies nothing about the relative amount of information compared with another primed numeral having more or fewer primes on it.
The entry N/A means not applicable, or no transmission relevant to the particular 600-series in a particular path diversity channel.
Thus in Packet Transmission Table embodiment 1, packet 601 is put on, or connected to, and sent via path A and path B. Next, the process and apparatus take packet 603 and connect it to and send it via path A and path B, and so on. This process embodiment simply doubles the bandwidth utilized, compared to sending the packets via one path only. This repetition coding embodiment is advantageously uncomplicated, while more sophisticated coding embodiments (as in rows 2 and 3) add more complexity and advantageously provide less bandwidth or greater bandwidth efficiency.
Note in embodiment 4 that all three packets in a set like 601', 601'', 601''' can be combined in pairs or all three to provide more information than any one of the packets separately represents.
Note in embodiments 7 and 8 that packet 603' is sent before packet 603. Thus, some embodiments send all packets that are dependent on each other at the same time onto diverse paths. Other embodiments send one packet that has the most information first and other packets dependent on the one packet are sent somewhat later in time over diverse paths. Still other embodiments send one or more packets that have relatively little information first, and then one or more packets that have more information or all the information are generated, issued, or sent somewhat later in time over diverse paths.

Control Software 451 selects from a list, table, or algorithm what proxy connections, channels or paths are to be opened hard-coding their diverse routing information into the VoIP application software to improve it. Or a user interface is added to improve conventional VoIP application software to let the user select the routes at run-time, say by a set up or configuration program and graphical user interface 481 associated with it.

Figure 8:
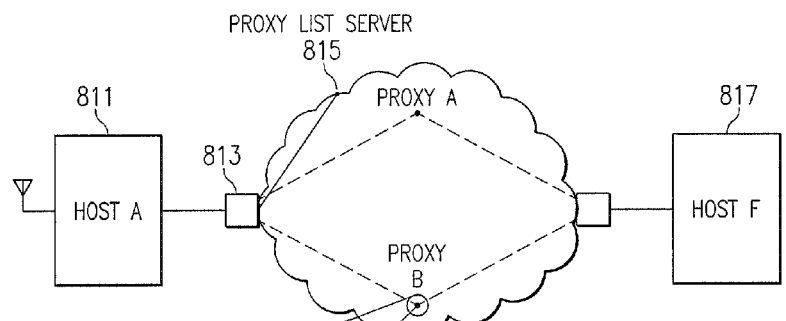
FIG. 8 is a block diagram of an improved packet network with a magnified inset diagram of an improved proxy computer in the packet network.
Figure 18:
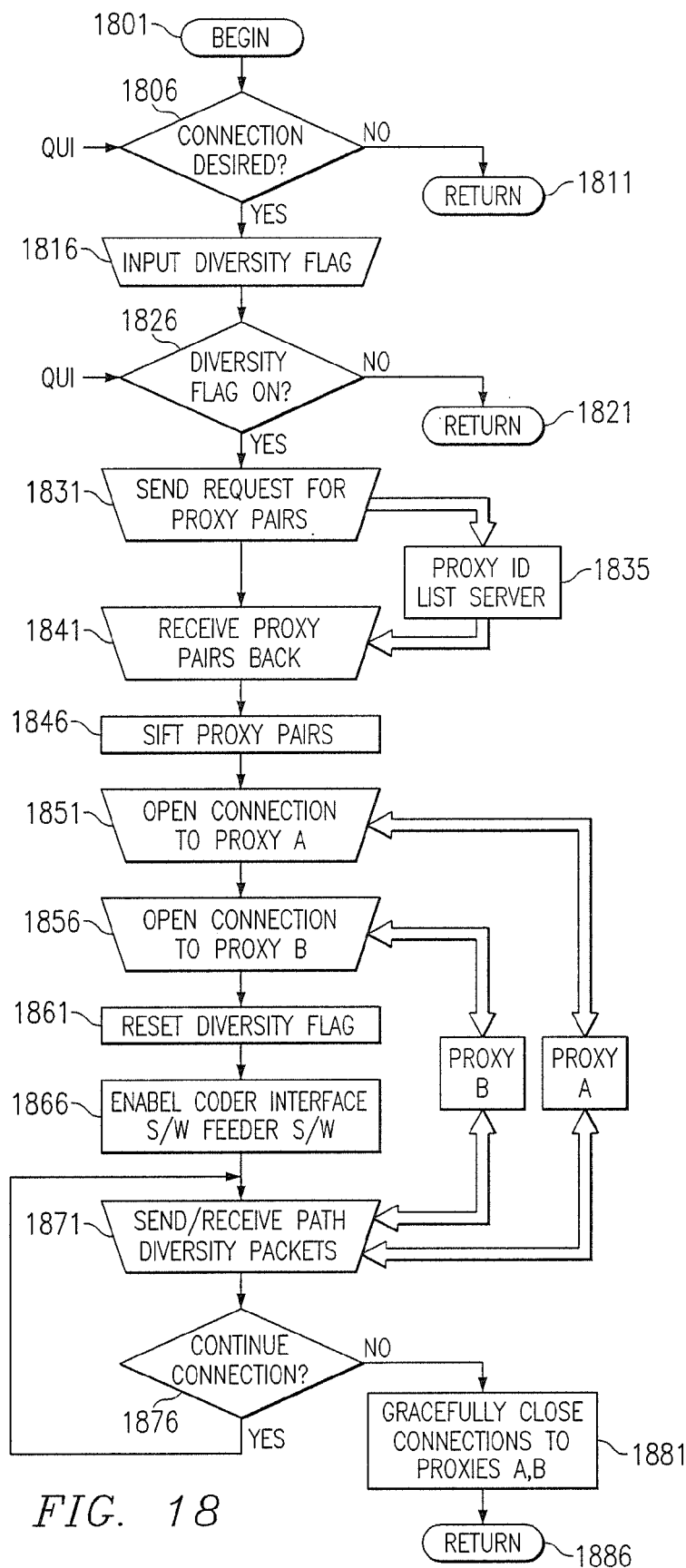
FIG. 18 is a process flow diagram of improved software for a computer to connect to a packet network to perform packet network path diversity.

Still further, in FIGS. 8 and 18, a VoIP application control 451 and interface block 441 are improved and automated to contact an informational server (151 of FIG. 1 or 815 of FIG. 8) with a predetermined URL address on the Internet, which informational server has been preloaded with a list of forwarding servers called proxies herein that are suitable for path diversity VoIP/VoP/media-over-packet applications and permit diversely routed packets to travel over them. Location and suitable statistical information about these listed forwarding servers is provided (see FIGS. 19-25). In a first variant, the informational server computes from the source and destination information uploaded or provided by the software program, together with the informational server's own list of forwarding servers and their descriptive information, a selection of two or more of the forwarding servers to recommend to the automated software at the source 103. The source routing information for the recommended forwarding servers is sent to source 103 from the informational server 151 or 815, whereupon the source 103 automated software inserts and uses that routing information in its path diversity operations of FIGS. 1 and 4.

A microphone 161.1 of the PC (or 181.4 of a handset) produces an analog electrical speech waveform from a speaker's voice, for instance which is digitized by analog-to-digital converter A/D. Speech coder 421 compresses the digitized speech waveform down to a very low bit rate, which is conveyed to the packet network path diversity stack in blocks 441, 461 which has open at least two routes A,B, etc. over the network 100. The VoIP application control 451 has opened the routes. The interface 441 has commanded the IP software stack to open a connection to intermediate machine A and has commanded the IP software stack to open a connection to intermediate machine B (and possibly also C, D, etc.). The IP software stack 461 then returns a software object that represents the connection to intermediate machine A and another software object that represents the connection to intermediate machine B, etc.

The speech coder 421 and packetizer 431 send packets to the interface 441, and the interface 441 sends the data as the packets or otherwise to the respective software object corresponding to connection to the intermediate machine A or B (or C, etc) to which the data is being directed by the interface 441.

In the simple example of the repetition coding (duplicated packets) embodiment, the packet 601 from the speech coder is sent to both software object A and software object B, and the next packet 603 from the speech coder is sent to both software object A and the software object B, etc. Once a connection is open, in this parlance, all arrangements are in place to send the packets generated by the voice coder 421 at the source 103 to the forwarding server 131, 133, etc. identified by the routing information.

In addition to having two connections open by operation of the network stack, and having a speech coder application 421 running, one form of inventive improvement provides more. The improvement links, by means of interface software 441, the software objects A and B provided by the network stack 461, with the speech coder 421 so that mutually-dependent packets 111 and 113 from the speech coder 421 are delivered to the software objects A and B to get sent along the diverse paths 117 and 119. And in an embodiment of repetition coding, the packet 601 from the packetizer 431 is sent to software object A, and the interface 441 process itself copies packet 601 and sends copied packet 601 to software object B.

Thus, one way improves hitherto available VoIP application software to add 1) a few lines of code to command the network stack 461 to open two or more software objects A, B, etc. to connect to diverse paths 117 and 119 in the network 100, and 2) software code causing the computer 103 to copy the compressed speech data which the speech coder 421 produces and send that copied data to said two or more software objects A, B, etc. representing path-wise diverse routes 117, 119 through the network 100. In other words, hitherto available VoIP application software commands the network stack to open one connection to the destination and sends speech coder data to that connection. The improvement of this one embodiment, for one example, copies the speech coder 421 data and sends it at least one more time digitally to the same destination over at least one other path-wise diverse packet network connection.

The skilled worker writes a piece of application software 411 as in FIG. 4 to run under the operating system 465, e.g. Windows. This piece of application software 411 has a voice coder 421 combined with interface improvement code 441, 451 as described and further combined with the Internet Protocol software stack 461. A graphical user interface GUI 481 is programmed using Visual Basic and/or Visual Development Studio, a commercially available development tool suite available from Microsoft, for example. Buttons are provided with the graphical user interface at source 103 to initiate and configure its operations as described herein, such as to "dial" a number identifying the destination 105, as well as contact an informational server 151 or 815, or otherwise, to establish the desired source routing preparatory to path-diversity VoIP transmissions from the source 103. The technique of writing applications for a given operating system environment is known to the skilled worker and needs no further description. Thus, a "wizard" or otherwise user-friendly application software product is completed for path-diversity VoIP/VoP/media-over-packet as contemplated herein.

Once written by the skilled worker, of an ISV (independent software vendor) for example, the computer manufacturer, or end-user as the case may be, installs the ISV software on the Windows computer.

Reception Software

In FIG. 5, destination 105 has improved VoIP reception software 711. The source 103 network stack 761 communicates to destination 105 that two channels or connections are open via intermediate machines A and B. The network stack 761 provides objects 721 and 723 in destination 105. Objects 721 and 723 provide as output those packets forwarded by intermediate machines A and B that have not become lost in network 100. The TCP in the IP stack is used for call-connection, other signaling and non-real time data packet transmission, and a type of network software called UDP is utilized, among other satisfactory alternatives, for the VOIP/VOP/media-over packet transmissions.

In one embodiment of the receiving software, objects 721 and 723 for channels A and B respectively are coupled to a software module 731 called "feeder software" herein, which in turn depacketizes and couples received compressed speech data to a decoder 741 that passes decoded speech to a digital to analog converter DAC-and-amplifier 743 to headphones or a loudspeaker 162.i. Decoder 741 is a decoder which operates according to a process that recovers the speech or other audio information that was compressed according to the complementary process utilized in the coder 421 of FIG. 4 at source 103.

Feeder software 731 operates according to any of a variety of alternative embodiments complementary to whichever process was implemented in coder 421, packetizer 431 and interface 441 of FIG. 4 to get the packets to source 103 software objects for paths A and B. In addition, delay jitter handling and compensation for lost (including late) packets using path diverse dependent packets is also provided herein. Some example embodiments relative to feeder software 731 follow:

First Feeder Embodiment: Repetition coded packets. Feeder software 731 establishes buffers for packets arriving from channels A and B and checks their tags, issuing them in tag-order to decoder 741. If a next packet tag to be issued is found with a packet in the channel A buffer whether or not it is in the channel B buffer, then the packet in the channel A buffer is issued to the decoder 741. If a next packet tag to be issued is found with a packet in the channel B buffer but not the channel A buffer, then the packet in the channel B buffer is issued to the decoder 741. If the packet is found in neither channel buffer, then a lost packet signal is issued to the decoder, which handles the lost packet event according to the algorithm native to the decoder. Such algorithm provides silence, or white noise, extrapolation of previous packets, interpolation of previous and succeeding packets on hand, or other suitable signal.

Second Feeder Embodiment: Dependent packets. Source 103 communicates to Destination 105 the type of mode of transmission from the Packet Transmission Table that is to be used. Feeder software 731 establishes buffers for packets arriving from channels A and B, and so on, and checks their tags, issuing them in tag-order to decoder 741. If a next packet tag to be issued is found with an "unprimed" packet (see Packet Transmission Table discussion) in the channel A buffer and a "primed" packet in the channel B buffer, then the unprimed packet in the channel A buffer is issued to the decoder 741. Conversely, if the unprimed packet is in B buffer, and a primed packet is in A buffer, then the unprimed packet in the B buffer is issued to decoder 741. If a next packet tag to be issued is found with a packet in one channel buffer but not another channel buffer, then the packet that is present in the channel buffer where it lies, is issued to the decoder 741. If no packet having the tag is found in any channel buffer, then a lost packet signal is issued to the decoder, which handles the lost packet event according to the algorithm native to the decoder. If in the Packet Transmission Table, both packets are primed in both of the channel buffers, then both packets are issued to the decoder 741, which puts the information in both packets together according to the algorithm native to the decoder. If more than two channels are used, then channel C, D, E . . . buffer(s) to correspond to the respective additional channels are provided, and feeder software operates with the primed and unprimed packets to analogously supply as much information to the decoder 741 as possible.

A transmission embodiment like 411 and reception embodiment like 711 are advantageously provided together as a combined software application in the same computer 103 or at the same network node. In this way, two-way VOP, VOIP, and media over packet communications are readily established when the combined software application 411, 711 is repeatedly installed in two or more computers or nodes of the network. Also, networks of three or more computers advantageously support improved distribution of media (as in FIGS. 11 and 12) wherein path diversity to any given single computer introduces minimal additional network burden because multiple paths are available to reach multiple computers respectively already.

Dynamic Use of Statistics

Understanding the statistics of the network behavior is useful, such as the correlation of packet delay behavior in different paths relative to each other. In FIG. 2, some network behavior has very bursty packet delay behavior, wherein most of the time the packets arrive with less than the maximum tolerable delay 317, and only occasionally does the network really violate the tolerable delay as with peaks 313 and 315. Such burstiness leads to, or implies, a certain optimal coding for that system. Thus, embodiments are contemplated wherein a speech codec mode of coding is selected to depend on the statistics of the network communication over diverse paths at a given time.

A first embodiment identifies two physical machines 131 and 133 through which dependent packets from source node 103 are made to pass on their way through network 100 to destination node 105. Physical machines 131 and 133 are located diversely in the network 100 so that a communications improvement will occur. Ordinarily, substantial geographical separation of machines 131 and 133 is sufficient to establish diversity of network location and to guarantee diversity of paths for this purpose.

A physical router such as 131 or 133, or server 151, or otherwise, monitors various paths through the system and sends out test packets to certain points in the network and measures statistics on QoS and QoS correlation for various paths through the network. When it finds the different places it tabulates their locations that provide acceptable decorrelation between the signals or packets. Unlike a wireless system which might provide a channel model for that system, the physical router or routers in the network build up lists of nodes that provide acceptable decorrelation for signals originating at a given source 103 and destined for a given destination 105.

The source node 103 itself alternatively tests the network by sending test packets and gathers QoS data, QoS median/average, and QoS correlation statistics on various intermediate nodes to determine where these nodes appear on a decorrelation plot. For example, a decorrelation plot for nodes 131 and 133 plots respective points for each of many sets of test packets. The coordinates of any one point on the decorrelation plot are $(QoS.sub.A, QoS.sub.B)$ where $QOS.sub.A$ is a value of QoS of transmissions through node 131 and $QoS.sub.B$ is a value of QoS of transmissions through node 133. Correlation r is computed from these QoS pairs according to any standard statistical correlation calculation formula.

Thus, the source 103 builds up a list of intermediate nodes and their correlations and selects particular intermediate nodes like 131, 133 from the list and through which packets and dependent packets are respectively sent on their way to destination 105. The selection method of source 103 or of a router along the way scans the list of intermediate nodes wherein the list includes statistical information for each intermediate node gathered from the earlier sending of test packets from source 103. The scanning method determines one subset or plural subsets of listed nodes wherein the statistical information for the subset demonstrates independent random times of arrival. For example, a criterion of selection is suitably that the statistical correlation r between two intermediate nodes QoS's be less than a predetermined amount. The predetermined amount is suitably equal to 0.5, or even more preferably $r=0.3$ or less.

The intermediate nodes 131 and 133 thereby constrain the dependent packets respectively passing through the different intermediate nodes to take paths which exhibit sufficient path diversity to improve the QoS and decrease packet loss ratio compared to conventional transmission. It is possible to send packets across a continent or further to obtain path diversity between geographically close locations of a source 103 and destination 105, but such extreme measure is ordinarily not necessary when they can be sent to closer intermediate nodes that also provide suitable path diversity.

Figure 6:
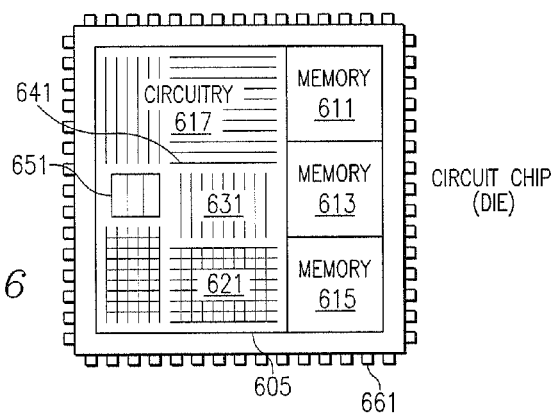
FIG. 6 is a block diagram of a semiconductor integrated circuit embodiment of the invention.

Turning again to FIGS. 4 and 5, path diversity software of FIGS. 4 and 5 or otherwise as contemplated herein is implemented on non-volatile memory 611 in a single chip 613 as in FIG. 6. In other embodiments, the path diversity software of FIGS. 4 and 5 is partitioned between plural chips (FIG. 17), stored in storage 165.1 such as a hard-disk drive (FIG. 16) or other storage, distributed on magnetic media and optical media (CD-ROM) (FIG. 15) and other tangible media, and downloaded over the Internet from web sites. Path diversity software of FIGS. 4 and 5 is also implemented in or loaded into computers shown in FIG. 1, like 103 and 105, in routers at nodes like 131 and 133 of network 100, gateways connected to PSTN 185, in cellular telephone base stations 183 and 187, and in cellular telephones 181 and 189 themselves. In web television sets, and mobile web TVs, tuners 495 and 795 are included to drive display 167.1 and 167.*i* in the systems. Display drive electronics 497 controls the display apparatus.

In one type of base station networking embodiment, the base stations 183 and 187 of FIG. 1 are respectively coupled directly to the packet network 100 via their own gateways 191 and 193. Base stations 183 and 187 thus communicate by VoP or VoIP over the packet network 100 and bypass PSTN 185.

Cell phones 181 and 189 also use CDP cellular digital packet data to send datagrams over packet network 100. They are further improved as disclosed herein to send VoIP or VOP datagrams at a sufficient data rate and with packet network path diversity for high QoS. The cell phone constitutes a physical layer interface (PHY) which is complemented by higher layer software as FIGS. 4 and 5 to make it a VoP or VoIP phone. Note further that while wireless path diversity in the sense of multiple through-the-air wireless paths is a less emphasized part of this discussion, such wireless path diversity can coexist with the herein more-emphasized packet network path diversity improvements and embodiments of process, integrated circuits and systems.

In the cell phone, the software of FIGS. 4 and 5 is manufactured or downloaded into the unit. Then the microphone 161.1, keyboard 163.1 or i, monitor 167.1 or .i, and speaker 162.*i* of FIGS. 4 and 5 are respectively replaced by FIG. 1 cell phone 181 microphone 181.4, manual input 181.1, visual interface 181.3 and speaker 181.5. In this way, an advantageous cell phone embodiment is constituted for packet network path diversity enhanced QoS VoP and VoIP and other media packet communications. Note that in FIGS. 4 and 5 blocks 471 and 705 connect to either a wireline (double-arrow) or to a radio frequency antenna 181.7. Blocks 471 and 705 are any kind of modem or any device that has a link layer and/or physical layer for communication purposes.

The cell phones 181 and 189 are suitably provided with positioning software such as GPS (global positioning software), Snaptrack™ or the like. The cell phones have a wearable mobile enclosure with a belt-clip 181.9 and 189.9, and their circuitry is suitably mounted in an automotive enclosure such as in the Auto shown in FIG. 1. PCS (Personal Communicator System) wristband apparatus and other highly mobile embodiments with voice-recognition control of the path diversity and other blocks are also contemplated.

The software process blocks of FIGS. 4 and 5 are partitioned to a microcontroller and to a DSP according to speed, power, economic and other tradeoffs as the skilled worker suitably elects. Speech codec and modem suitably run on the DSP. The TCP/UDP/IP stack runs on a DSP but suitably also is partitioned instead into the microcontroller.

In systems where a cell phone 189 communicates voice wirelessly to its base station 187, the base station recovers the voice via a decoder 491 of FIG. 4. Then according to improvements contemplated here, the voice is recorded by the speech coder 421 of FIG. 4 and base station 187 uses the rest of the software blocks of FIG. 4 to send packet network path diversity packets onto the packet network 100 of FIG. 1. In the reverse direction, as illustrated in FIG. 5 software further implemented in base station 187, the packets come via modem 705 through the FIG. 5 software including a speech decoder 741 whereupon they are recoded or remodulated by recoder 791 and wirelessly communicated from base station 187 to the cell telephone 189 being served.

In a further network and system infrastructure embodiment, a VoIP Solution Provider improves gateways 191 and 193 with the software of FIGS. 4 and 5 for packet network path diversity communications. Then cell phone users and cellular telephone base station operators of equipment unimproved by software of FIGS. 4 and 5 couple their equipment to improved gateways 191 and 193. The gateways 191 and 193 are also suitably provided as, or added as an add-in printed wiring board or card into, one or more private branch exchanges (PBXs). For large service volumes, as dozens, hundreds or thousands of simultaneous calls, the software of FIGS. 4 and 5 in gateways 191 and 193 and such PBXs is straightforwardly made to have multichannel service, by running many voice calls with multichannel speech codecs and multichannel VoIP control for each call. Keyboard 163.*i* and monitor 167.*i* interface to the software of FIGS. 4 and 5 for occasional supervisory monitoring and control of the multichannel service.

In FIG. 6, a semiconductor chip embodiment has a core microprocessor, microcontroller, or digital signal processor 610 combined on a single chip with a section of nonvolatile memory 612 and sections 613 and 615 of SRAM (static random access memory). The nonvolatile memory 612 is loaded with, or manufactured to have stored therein, the interface software of FIG. 4 as well as such other blocks of speech coder, packetize, VoIP control, IP stack, and GUI as the skilled worker selects. Further, the nonvolatile memory 612 is loaded with, or manufactured to have stored therein, the feeder software of FIG. 5 as well as other blocks such as speech decode as the skilled worker selects. Note that the software of FIGS. 4 and 5 overlaps in process diagrams, but can advantageously use the same GUI, VoIP control, IP stack and modem, for example.

Further in FIG. 6, the single-chip integrated circuit DSP 610 has an instruction decoder 617, at least one ALU (arithmetic/logic unit) 631 and a multiplier unit 621. Buses 641 interconnect decoder 617, ALU 631, multiplier 621, and memories 612, 613, 615, with a DMA and bus interface unit 651.

Figure 7:
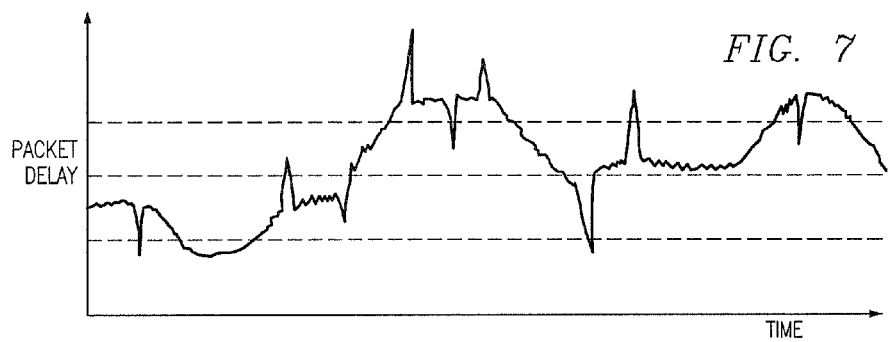
FIG. 7 is a graph of packet delay versus packet number demonstrating a second type of behavior of conventional communications over the Internet.

In FIG. 7, packet delay rises above the maximum tolerable delay level 317, and stays for a length of time (in packet numbers) rather more extended than the burstiness in FIG. 2 suggests. Note that the average packet delay 711 and median packet delay 731 in FIG. 7 are higher than the average packet delay 311 in FIG. 2. Although lab measurements between two particular communication points or nodes were bursty like FIG. 2, it cannot be stated with certainty that other paths might not have quite different statistics as in FIG. 7, or otherwise. Thus, the study of the Internet and other networks is remarkable because of the variety of possible traffic models which can describe the communication between the same two points at different times, and between another pair of points at even the same time as the first two points.

In view of the dynamic and unpredictable nature of the networks, another type of embodiment provides a very smart, adaptive software module that does multiple path operations according to a process that 1) picks paths to suit the kind of coding or compression it has, or coded or compressed to suit the paths it sees and 2) does various path and QoS statistics measurements discussed in connection with FIGS. 2 and 7 on the fly at run-time to choose paths for the VoIP application.

In FIG. 8, a host computer 811 (host A) is connected to a packet network via an edge device 813 such as an Internet gateway or router. When an application on host 811 calls for a connection to a host computer 817 (host F), host 811 first accesses a proxy list server 815 in order to identify some proxy servers A and B in the packet network through which servers the packets from host 811 are to be routed using path diversity as described herein.

Process Table 1 summarizes and further describes a sequence of steps 851, 853, 855, 857, 859 to set up a packet network path diversity connection. The step numerals are in the Process Table 1 and not in the drawings.

In FIG. 8 and Process Table 1 step 851, Host 811 first accesses the proxy list server 815 identified by its URL (Universal Resource Locator, also known as a web address) or an IP (Internet Protocol) address provided to host 811 either by automatic download from an ISP (Internet Service Provider) or embedded beforehand in commercial software improved to support path diversity operations. Thus, the identity of one or more proxy list servers typified by proxy list server 815 in FIG. 8 is widely publicized in practicing the embodiment.

When host 811 accesses the proxy list server 815 with a request for proxy computers, then proxy list server 815 executes step 853 and then in a step 855 returns a list of proxy computers or proxy machines for use in establishing communications between host 811 and host 817.

In a step 857, Host 811 using the list identifying proxy A and proxy B, now opens an actual path diversity connection to its requested destination Host 817 through both proxy A and proxy B. In other words, two (or more) connections are open at once or concurrently through respective proxies for media-over-packet communications packets and their dependent packets. As part of opening the two (or more) connections, proxy A and proxy B get enough information, through the signaling protocol used by Host 811 to open each connection, in order for proxy A and proxy B to each thereupon open their own respective connections to Host 817. The signaling protocol of HTTP for the world wide web is suitable and does not require further explanation of its inner details here.

Magnified portion 819 of FIG. 8 illustrates an enlargement of proxy B. There a connection AB at left is a link from Host 811 to Proxy B which was initiated, opened and made by Host 811. The proxy B itself actually opens another connection BF from proxy B to Host 817 based on information transmitted to proxy B by Host 811. In other words, proxy B knows the identity of the destination host 817 because it received the identifying information of host 817 from Host 811. Once the connections AB and BF are open, then proxy B shuffles packets back and forth, meaning that proxy B forwards or transfers any packets from Host 811 to Host 817 and vice versa. The operation of proxy A is suitably identical with the operation of proxy B in this respect in this example. Proxy A and Proxy B can also do processing on the packets that is more complex than mere forwarding.

PROCESS TABLE 1

STEP 851: Host 811 contacts well-publicized proxy list server
STEP 853: Proxy list server 815 executes a process that identifies proxies as illustrated in connection with FIG. 18 and/or FIG. 25.
STEP 855: Proxy list server 815 responds with list including proxy A and proxy B; And Host 811 receives the list including proxy A and proxy B
STEP 857: Host 811 opens connection to Host 817 via proxy A and proxy B.
STEP 859: Host 811 and Host 817 execute packet communications via proxy A and proxy B. Proxy A and Proxy B shuffle, or relay, respective diverse packets directed to them, as illustrated in inset 819.

Figure 9:
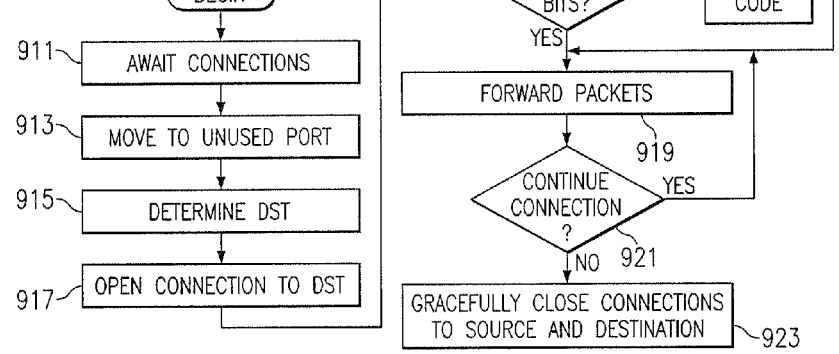
FIG. 9 is a flowchart of a process of operation of the improved proxy computer of FIG. 8.

In FIG. 9, each proxy such as proxy A and proxy B in a step 911 awaits a connection request on a port of the proxy that has preestablished availability for access from sources generally, and according to a particular protocol such as TCP, UDP, etc. Note that access is accomplished by using addresses that not only address a particular machine like proxy A, but also address a particular port of that machine.

The port is like a mailbox and no processing by proxy A due to a Host 811 attempt to make a connection is required while proxy A is awaiting the connection because packets that come over the network do not get delivered to a port of proxy A unless they are addressed to that port. And, if a packet does not get put into the particular mailbox (port), no processing is needed in that mailbox. So, traffic is going through the proxy all the time but unless the traffic is destined for a particular port of the proxy, the traffic never arrives at the port.

Host 811 can be browsing the Web at the same time as it is sending e-mail, and at the same time as it is sending voice over IP. Thus, several application programs running on Host 811 can use one connection. When host 811 sends a transmission to proxy A and to proxy B, host 811 addresses a particular port on proxy A and another particular port on proxy B whose existence as a port signifies that it is accepting VoIP packets and will act as a proxy to forward the VoIP packets on. If there is no proxy on a given machine, there will be no processing at the particular port to receive the packet and no handshake or processing to respond and forward the packet on to the destination Host 817. A proxy may be forwarding hundreds of VoIP calls, e-mails, and web accesses, but each one of these communications is referred to in a step 913 its own particular port of the proxy after the first access to the general-availability port of the machine and as soon as a connection is established whereupon that data packets are then sent over the connection.

Once the handshake protocol is accomplished Host 811 and the particular application, e.g., VoIP, on host 811 is the only entity that Proxy A appears to be talking to from Host 811 application perspective, and likewise for Proxy B. Similar remarks apply to the connection between Proxy A and Host 817 and the connection between Proxy B and Host 817. Thus, even if Hosts 811 and 817 have other application programs (apps) using the packet network, and indeed other VoIP calls going, each particular call in this example is set up with the particularity and path diversity service just described via proxies A and B.

When a packet arrives addressed to a port of proxy A, then a handshake is initiated according to the protocol type, such as HTTP, NTP, Domain Name Resolution, Real Audio, Real Video, VoIP, etc. H.323 (an ITU-T recommendation) and SIP (an IETF standard), have a signaling protocol for VoIP. Part of the protocol in a step 913 arranges operations of Host 811 and Proxy A and Proxy B to move communications for this connection from the original port to a particular unused port that the proxy dedicates to the connection with a particular application program running on Host 811.

In a next step 915, the proxies A and B each determine the identification information for the final destination Host 817. In one example method, Host 811 itself sends data in an early packet to each proxy A and B, the data including the address or other identification information for the final destination Host 817.

Then in a step 917, proxy A and proxy B each open a respective connection to the destination Host 817. Then in a step 919 of FIG. 9, each proxy forwards packets as a two-way intermediate node as in enlarged portion 819 of FIG. 8.

A decision step 921 determines whether the connection is to be continued or closed. If continued, then operations loop to step 919 to continue forwarding packets back and forth between hosts 811 and 817. The process of FIG. 9 is operative in both proxies A and B.

If the decision in a given proxy A or B in step 921 is to close the connection, say because of disconnection information received from either host 811 or 817, then operations then proceed in that proxy to a step 923. In step 923, proxy gracefully closes connection AB to source host 811 and connection BC to destination host 817, whereupon operations return to other processes unrelated to the subject at hand.

The FIG. 9 proxy process is further improved by interposing further steps between steps 917 and 919. Then after step 917, a decision step 931 tests the packets for dependency identification information and path diversity identification information as discussed with FIG. 14 and FIGS. 10 and 13. If path diversity is not being used, operations branch to step 933 to introduce path diversity of FIG. 10, and then step 919 is reached. If path diversity is already being used as determined by the proxy in step 931, then operations inhibit an unnecessary proliferation of path diversity by bypassing step 933 and going directly to step 919.

Advantageously, the operations described above for this particular embodiment are free of source routing which for some purposes is undesirable. In source routing, every packet from source Host 811 would have routing information, intermediate node addresses for the network hops as well as final destination 817 address, all put in the packet header, thereby directing the path of the packet through the network. Alternatively, the source Host 811 advantageously addresses its connection request packet to proxy A in the header, but only in the payload (non-header) portion of the packet does Host 811 include the address of the final destination 817. Then it is up to the proxy A to itself make the connection from proxy A to final destination host 817.

Also, by contrast, the source Host 811 also addresses a second connection request packet to proxy B and in the payload (non-header) portion of that second request packet Host 811 also includes the address of the final destination 817. Then, again, it is up to proxy B to itself make the connection from proxy B to final destination host 817. As a result of these operations, at least two path diversity connections are now set up, ready for real-time data over packet and for dependent packets to be communicated ultimately to final destination host 817 with improved QoS without necessarily using source routing.

Discussion now returns to FIG. 8. In a first communication process embodiment, Host 811 sends a request to proxy list server 815 identifying itself, identifying Host 817, and requesting a path diversity proxy list X. Proxy list server 815 sends back the proxy list X. Next Host 811 selects a set of pairs of proxies from the list X according to the number (two or more) of proxies desired for path diversity using local list processing. The local list processing is suitably as uncomplicated as picking M proxies (M=2 in FIG. 1) in a predetermined order (or alternatively at random) from list X, or as sophisticated as using locally-developed network congestion information regarding the proxy candidates.

In a second communication process embodiment, Host 811 sends a request to proxy list server 815 identifying itself, identifying Host 817, identifying the number M (two or more) of proxies and requesting a path diversity proxy list X2. Proxy list server 815 sends back the proxy list X2 which not only has been sifted for acceptable proxies, but also has been sifted based on current network information about their congestion level maintained by proxy list server 815. Further, list X2 lists pairs such that the total number of distinct proxies in the pairs is exactly number M or close to number M. Then Host 811 selects a set of pairs of proxies from the list X2 according to the number M (two or more) of proxies desired for path diversity with little or no local list processing.

The subject of communication processes is further developed later hereinbelow in connection with FIGS. 18-25.

By contrast with a firewall with a proxy, the processes just described in FIG. 8 introduce multiple concurrently operating proxies introducing space diversity, or path diversity for information flowing from a host 811 to a host 817 in packets and dependent packets established in diverse paths through respective proxies. When proxies A and B are selected for space diversity then actual network path diversity is guaranteed with a high probability for the different packet streams for a given overall voice over packet connection.

A firewall recognizes and serves and is proxy for a protocol for a certain subset of machines out of the whole set of machines in the world. The proxy servers A and B are characterized in that they are chosen to virtually guarantee path diversity of communications.

A proxy is a program that runs on a machine. Advantageously, each of the proxy programs proposed here 1) monitor a specific general-access port of a packet network machine for voice over IP path diversity, 2) only then according to a special protocol which has a handshake that expects to receive the destination, that then opens the connection and then starts to forward VoIP packets between source and destination. This behavior has a rough analogy to a Telnet proxy or an FTP proxy; however, the protocol they use does not respond to a VoIP call request for proxy service. Instead, the protocol they use only gives service if Telnet or FTP protocol packets are accessing them, not VoIP packets.

The router machine here assigns a particular fixed address number, e.g. 100, to be the port address part of the router address that is a general-access port for only-VoIP accesses by host 811. Thus the assigned address number is the number of the port where VoIP applications accesses go, or the port that is dedicated for general-access by only VoIP applications. This particular port address is monitored by a router proxy program embodiment herein, see FIG. 9.

So if a VoIP application addresses that VoIP port, it communicates according to the VoIP protocol which the proxy program is programmed to accept. A protocol is a sequence of steps.

In Mail protocol, by contrast, as soon as a connection is opened, the first thing a machine sends back is its machine identifier, its mail version, and "hello" bits. Thus, if a non-VoIP application like Mail tries to address that same VoIP port, the non-VoIP application communicates otherwise than according to the VoIP protocol embodiment for proxy here, speaking a different language as it were. This non-VoIP communication is rejected as error by the VoIP proxy program at step 911 and is not forwarded.

Error is detected because, for example, a particular VoIP protocol embodiment requests a connection to open to an identified machine at an identified port, and then is done with its request, after this quite brief request activity.

Discussion briefly considers proxy selection next.

A few observations about path diversity lead to some rules of thumb in proxy selection at server 815. For example, suppose the source Host 811 and the destination 817 are in the same city, or otherwise very close to each other. Then using two different proxy servers in the same city may not provide much path diversity. A prestored list of region locations and proxy-to-proxy distances is provided in the list server memory bank as described more fully in connection with FIGS. 19-25. So then if a source is in region 1 and a destination is in region 1, then the proxy selection operates one way. If a source is in region 1 and a destination is in a region 5 that is not contiguous with region 1, then the proxy selection operates another way. A region-based approach is described in connection with FIGS. 22, 23 and 25.

Another approach determines network information dynamically, and a server continually sends out packets through the network and determines hop counts as described in more detail in connection with FIGS. 19 and 21. Preferably the hop counts for diverse paths are not so different that packets and their dependent packets would arrive at greatly different times (latency) and thus reduce the value of the path diversity to recovering information in lost packets. Yet another approach uses a table of distances or a table of correlations between proxies for path diversity purposes, as in FIG. 24.

Figure 10:
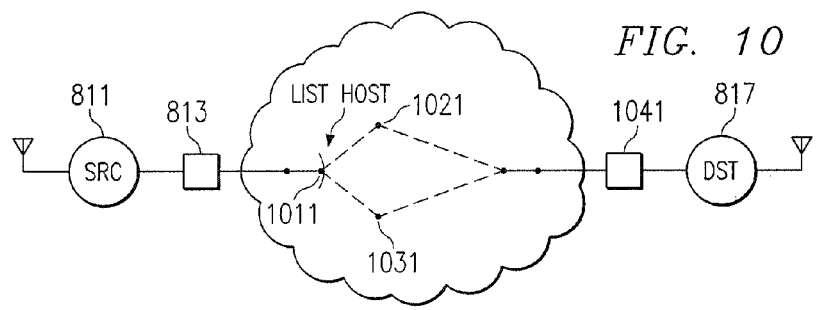
FIG. 10 is a block diagram of an improved packet network with an improved router in the packet network.

FIG. 10 shows advantageous path diversity introduced by a router 1011 or server deep within a packet network. A source SRC 811, such as an unimproved cell phone base station, is coupled to the packet network by an unimproved gateway 813. However, the advantages of path diversity are still obtainable by router 1011 which is improved with the software of FIG. 4 to produce packets and dependent packets by decoding and recoding. Even more elegantly, the improvement suitably replicates whole packets without decoding them and recoding them as in FIG. 4. Such improvement replicates VoIP packets as they are, and adds only an interface block of FIG. 4 with outputs A, B, etc. at the router 1011. Router 1011 then sends the packets and the new dependent, duplicate, packets by diverse paths to proxy 1021 and to proxy 1031. Router 1011 and proxies 1021 and 1031 operate according to improved processes wherein one or more decision steps determine whether the dependency identification bits (representing duplication, prime, double prime, etc., such as in the Packet Transmission Table) and path diversity identification bits (representing path index as described in connection with FIG. 13) indicate that these QoS enhancements are already sufficiently used. Thereby the steps decide to inhibit further introduction (FIG. 9 step 933) of dependency and path diversity by the router 1011 or proxies 1021, 1031. On the other hand, where the dependency and path diversity bits in an improved packet indicate that these improvement processes were not used, then an enable is generated to qualify the router proxy to initiate a process at step 933 to introduce dependency and path diversity as taught herein. Proxies 1021 and 1031, in turn, forward the packets on via a gateway 1041 to a destination base station 817. Destination 817 then executes the process of FIG. 5 to recover the speech with high QoS and then recodes it and transmits it from its base station antenna of FIG. 10 to the destination called cell phone (not shown) in the cell service area of base station 817.

VOP/VOIP Broadcasting and Multicasting

Figure 11:
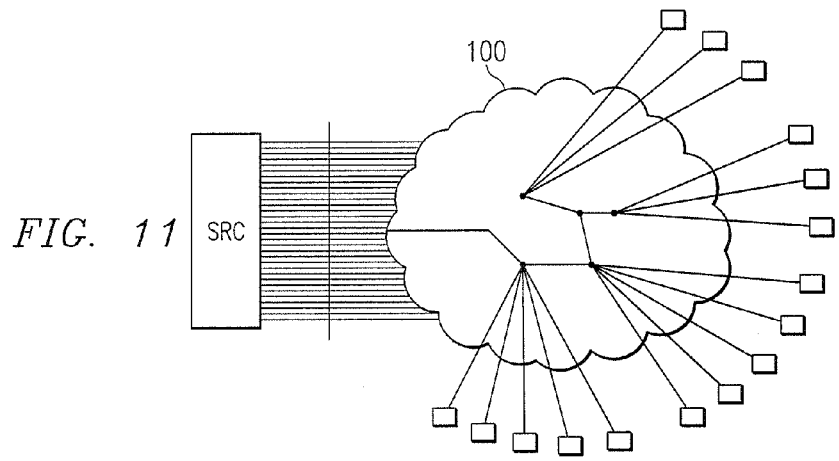
FIG. 11 is a block diagram of an improved path diversity broadcast process in a packet network.

FIG. 11 depicts broadcasting wherein a source server SRC 1111 sends out numerous communications streams which are each routed through the packet network 100 to the numerous users respectively. An advantage of broadcasting is that if a packet in one stream is lost, then only one destination is affected. In a broadcasting embodiment contemplated herein, the source server establishes numerous path diversity packet network connections with pairs of proxies to handle packet diversity for each of the communication streams of packets and dependent packets. This approach amounts to a replication of the processes and systems of FIGS. 4, 5 and 8 for path diversity VOP/VoIP/media over packet broadcasting.

Figure 12:
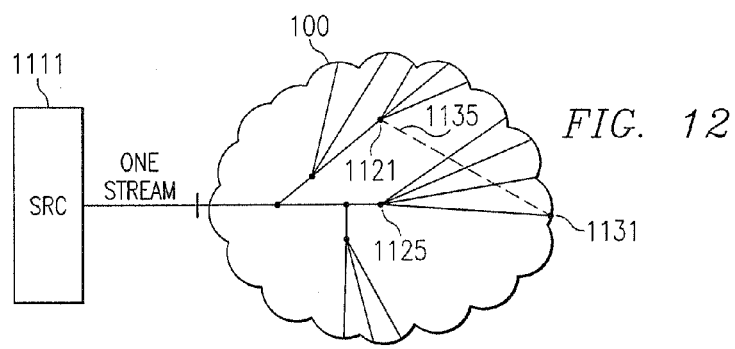
FIG. 12 is a block diagram of an improved multidestination packet distribution process in the improved packet network.

FIG. 12 depicts multicasting wherein a source server sends out one communication stream which is split by the routers at nodes in packet network 100 so that numerous users get a copy. Multicast has multicast addressing and users join multicast groups by requesting group membership from a multicast router like 1121 or 1125. Multicast is advantageously less burdensome on the source end of the network 100 than broadcast.

In FIG. 12 a multicast transmission originates at a source SRC 1111 which sends one communication stream. This stream is split by various nodes, including two router nodes 1121 and 1125, whereupon the one communication stream from SRC 1111 is distributed to numerous destinations at the periphery of the network cloud in FIG. 12. Among those destinations is a destination 1131 in the multicast group of router 1125.

Next, as shown by a dotted line 1135, router node 1121 is improved to add destination 1131 to its multicast group. In a process and system embodiment here, in other words, destination 1131 is improved as in FIG. 18 so it requests and establishes its identity in multicast groups of at least two multicast routers 1121 and 1125 for the same communication stream from source 1111. Destination 1131 is also improved with the software of FIG. 5 to improve the QoS of the communication stream by using packets from router 1121 to replace lost packets that should have come, or came too late, from router 1125. Thus, for purposes of destination 1131 the packets from router 1121 are dependent packets. Indeed, the packets from router 1121 constitute a special case of dependent packets, which are duplicates of the router 1125 packets which may become lost to destination 1131.

Thus, as just described, a remarkable process embodiment of FIG. 5 utilized in the context of FIG. 12 implements path diversity by receiving from diverse router nodes the same packets and combining them at the receiving destination, even though the SRC 1111 never had path diversity in mind.

The reader should beware that the term "multicast" may have quite a specific meaning to the person of ordinary skill, so that this improvement in FIG. 12 may be regarded as no longer being multicast at all if the operation is at variance with any industry specifications defining multicasting. However, in order to briefly motivate the nature and advantage of the actual substance of the improvements contemplated in connection with FIG. 12, the use of the term multicast is believed to be helpful as a starting point. However, any other privately created non-standard protocol for reducing source front-end loading of a packet network by having various routers do packet replication on the way from the source to multiple destinations, is also suitably improved according to the teachings herein that refer to "multicast."

SRC 1111 multicasts a stream to a group of proxy servers and opens up 2 (or more) information-related, or dependent streams to those proxy servers. The proxy servers open up multicast connections to the destinations, e.g. 1131. This process confers the advantages not only of multicast because of multicast to the proxy servers and multicast back down to the destinations. In essence two different streams are being multicast, but they are going through the proxy servers which confers path diversity, as well. Multicast is much less burdensome on the network than broadcast, and the introduction of path diversity herein increases QoS.

In a different embodiment related to FIG. 12, the SRC 1111 sends not one stream of communications but in two or more packet streams of packets and dependent packets representing the communications information. Thus, a first packet stream is 101, 103, 105, . . . . A second packet stream of dependent packets is 101', 103', 105' . . . . In this different embodiment, the first and second packet streams are each multicasted to each of the destinations by establishing path diversity packet network routing through diverse nodes respective to the first and second packet streams on their way to any given one destination.

In a third multicast-related embodiment, SRC 1111 multicasts one communication stream to proxy A and proxy B, which constitute in themselves two multicast destinations for SRC 1111. Here, SRC 1111 is in its connection opening packet(s) asks Proxy A and Proxy B to themselves to now act as multicast sources themselves. In other words, SRC 1111 has path diversity in mind and is executing a process embodiment for purposes herein. Proxy A then as a multicast source in its own right, multicasts the same communication stream to the multicast destinations. Proxy B as a multicast source in its own right, too, concurrently multicasts the same communication stream to the multicast destinations. Additional proxies C, D, etc., can be added at the request of SRC 1111, if desired.

Note that in the broadcast and multicast-related embodiments the selection of proxies or routers to establish the path diversity is suitably accomplished according to any of the selection process embodiments disclosed elsewhere herein, such as in connection with FIG. 18.

Figure 13:
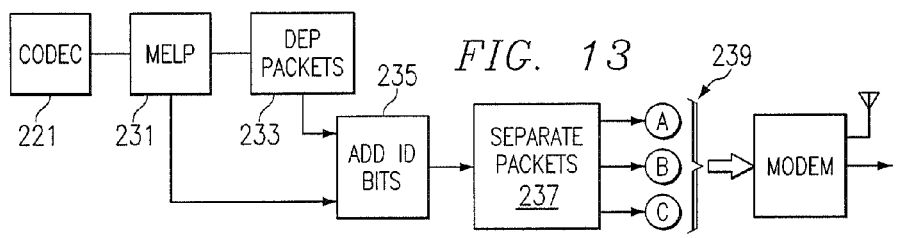
FIG. 13 is an alternative block diagram and flow diagram of an alternative embodiment of a sending process for path diversity.

Turning to FIG. 13, another process converts speech to plural dependent packetized data by means of a codec 221. The packetized data represents a statistical summary of the speech. A coding step or block 231 to produce a first packet is implemented by any suitable one of many speech coding processes such as CELP (code excited linear prediction), MELP (mixed excitation linear prediction), VSELP (vector sum excited linear prediction), etc. In a block 233, one or more dependent packets having information in common with that coded in the first packet from coding block 231 are concurrently generated along with the first packet or generated shortly after the first packet. A block 235 provides each packet like 601 from block 231 and its dependent packets 601',601", etc., from block 233 with respective sets of dependency identification bits and path diversity identification bits to identify that they are in a single dependent set of packets, and which one has the most information if they do not all hold the same amount of coded information from the speech. Next a block 237 separates the dependent packets, followed by a block 239 which sends or transmits the separated mutually dependent packets on different routes or physically diverse network paths via a modem or link layer and physical layer device.

Figure 14:
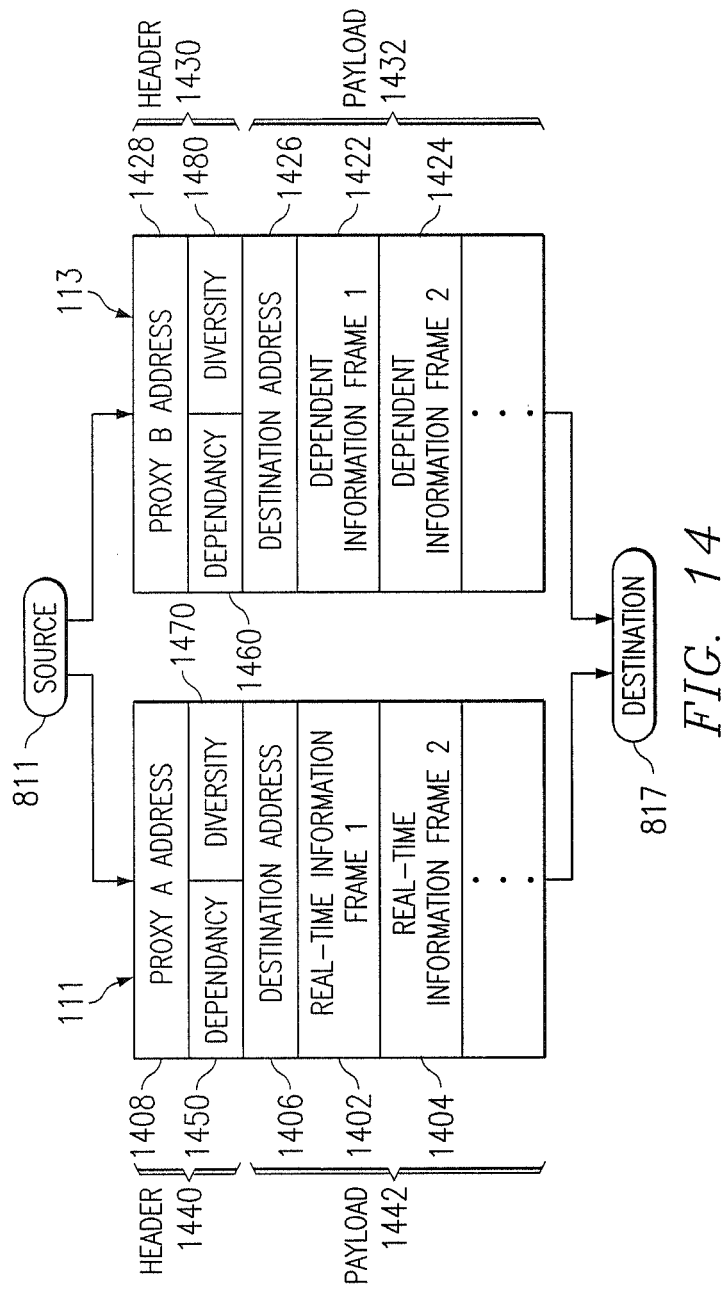
FIG. 14 is a flow diagram of an improved packet and packet ensemble embodiment for path diversity.

FIG. 14 shows FIG. 8 source 811 communicating to destination 817 a packet ensemble comprising, for example, the pair of packets 111, 113 in packet network 100 of FIG. 1. Packet 111 contains real-time information 1402,1404, a destination 817 address 1406, and a first proxy address 1408 for Proxy A. Packet 113 is a second packet having dependent bits representing information dependent on the real-time information 1422,1424; bits representing the same destination 817 address 1426; and bits representing a second proxy address 1428.

In FIG. 14, packet 113 has a header 1430 including the bits representing the second proxy address for Proxy B, and a non-header, or payload, portion 1432 including the dependent bits representing information dependent on the real-time information and the bits representing the same destination 817 address as packet 111. Also, packet 111 has a header 1440 including the bits representing the first proxy address for Proxy A, and a non-header payload portion 1442 including the bits representing frames of the real-time information and the bits representing the destination 817 address.

Placed where proxy software can swiftly test them are Dependency Identification Bits 1450,1460 and Path Diversity 1470,1480 Identification Bits. Their purpose is to inhibit unintended proliferation of unnecessary path diversity and temporal diversity additions when these have already been introduced elsewhere in the network, see FIG. 9 steps 931 and 933. Second, their purpose is to make possible an intelligent automated decision to introduce path diversity and/or temporal diversity by the router or gateway, as taught herein. Dependency ID bits suitably have a field for Coder Algorithm ID and a further 3-bit field for main packet (000) and up to seven temporal diversity dependent packets. Path Diversity ID bits suitably have a field for Interface 441 Algorithm ID, a further 5-bit field for up to 32 Packet Transmission Table embodiment ID numbers, and a further 3-bit field for main packet (000) and up to seven (7) path diversity dependent packets. In this way the router or gateway enhances the diversity techniques based intelligently and compatibly with the process in use.

Figure 15:
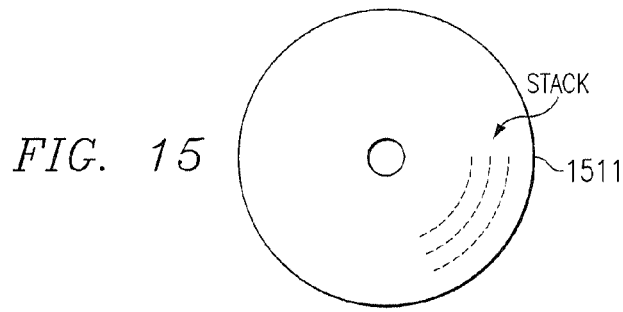
FIG. 15 is a pictorial diagram of an information storage disk.

FIG. 15 depicts an optically accessible storage disk 1511 that has physical variations representing bits of information. In one embodiment the bits of information represent processor instructions such as DSP instructions for speech encoder 421 coupled to packet network packet diversity software stack DSP and MCU instructions. Instructions in the network packet diversity software stack direct packets containing the real-time information from the sender computer 103 by at least one path 119 in the packet network 100 to the receiver computer 105, and further instructions direct packets containing information dependent on the real-time information from the sender computer 811 by at least one path diversity path 117 in the packet network 100 to the same receiver computer 105 in FIG. 1. These instructions comprise the blocks described more fully in connection with FIGS. 4 and 5.

Figures 19, 20:
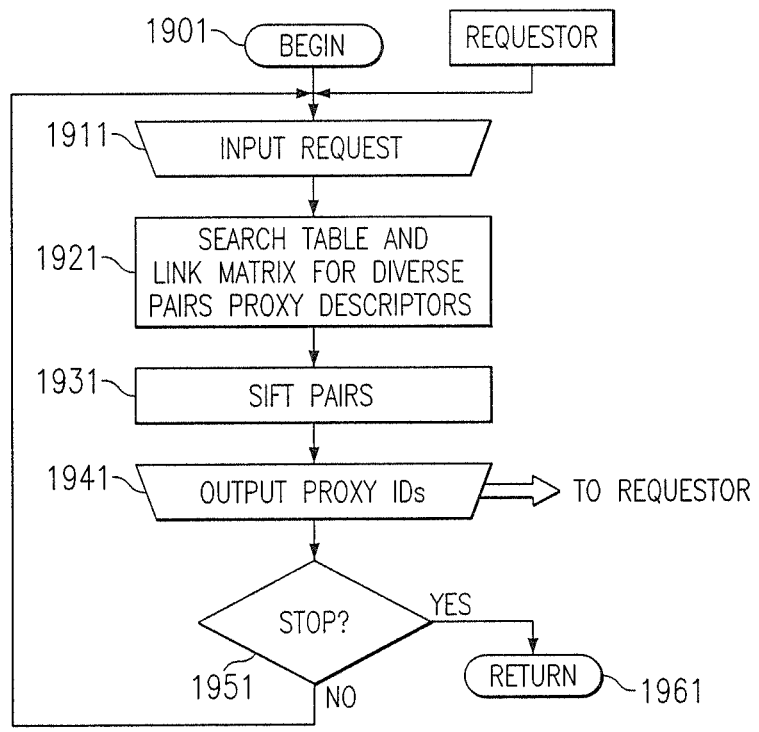
FIG. 19 is a process flow diagram of processing in an improved list server to respond to a requestor computer and supply proxy identification for packet network path diversity.
FIG. 20 is a tabular diagram of stored information about proxies for the list server operating according to the process of FIG. 19.
Figure 25:
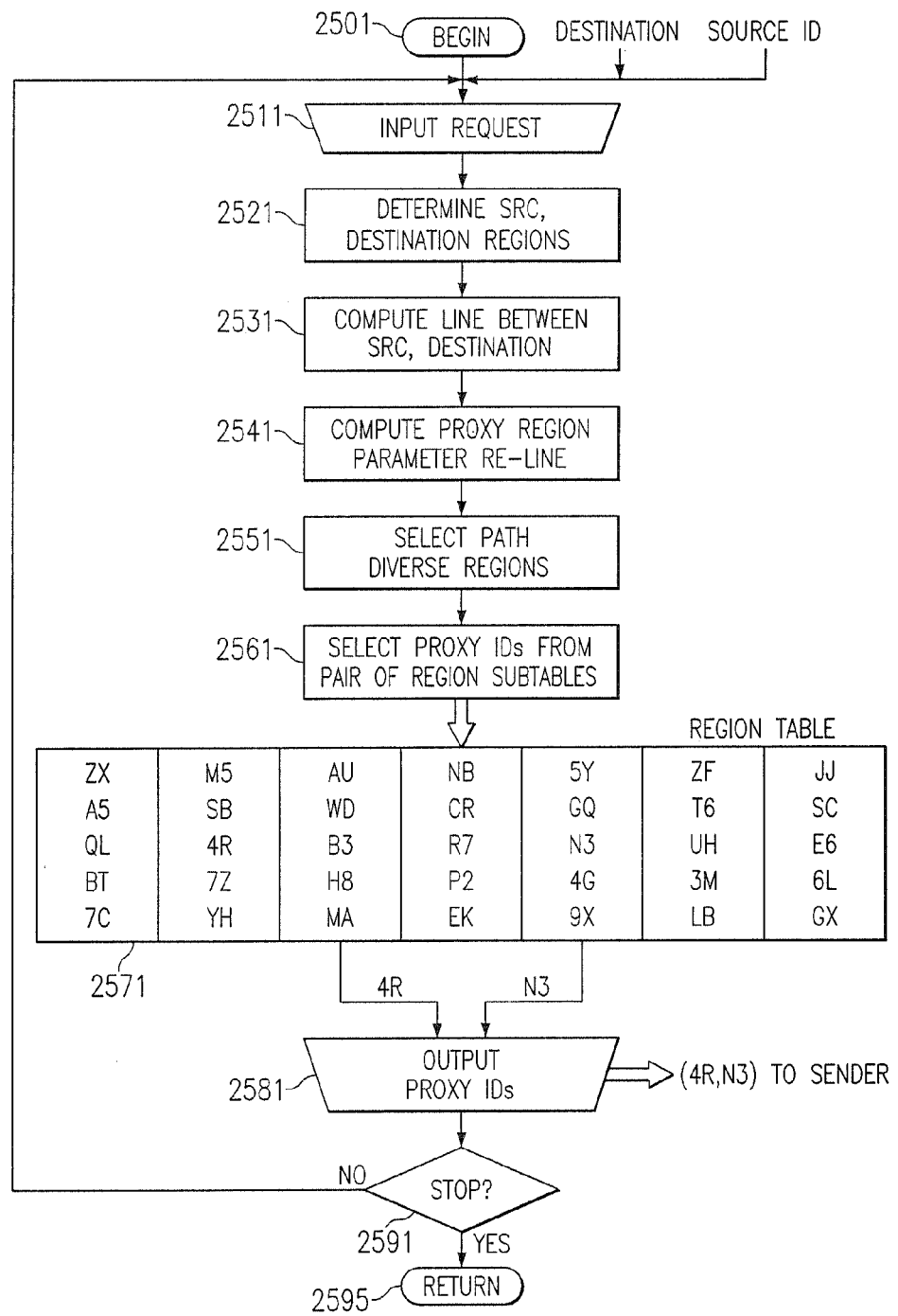
FIG. 25 is a second process flow diagram of a process alternative to FIG. 19 in an improved list server to respond to a requester computer and supply proxy identification for packet network path diversity.

In another storage disk 1511 embodiment the bits of information represent processor instructions for some or all of FIGS. 18, 19 and 25 for an identification process that identifies upon request at least two proxies for packet network path diversity using the stored information about the proxies.

In a further storage disk 1511 embodiment, the bits of information represent processor instructions for the process of FIG. 9 to use in a proxy router, gateway or other forwarding apparatus.

Figure 16:
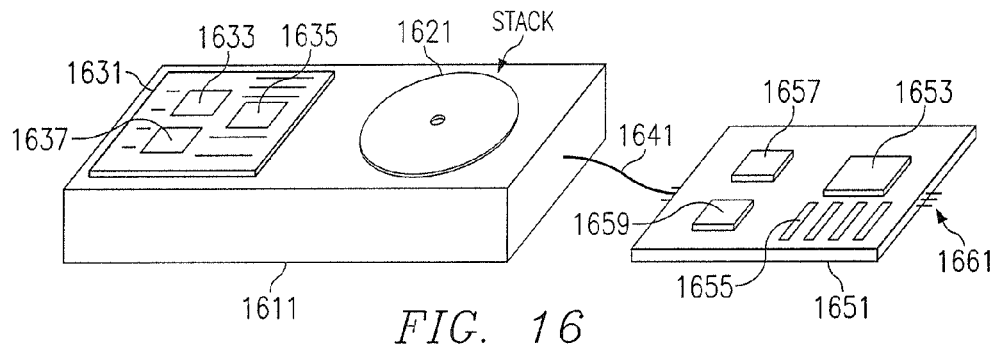
FIG. 16 is a pictorial diagram of apparatus including a hard disk drive and a computer printed circuit board.

In FIG. 16 storage 1611 is provided by a rotatable magnetically readable hard disk storage disk 1621 bearing any or all of the instructions described in connection with FIG. 15. The hard disk 1621 is controlled and read by a hard disk drive control circuitry assembly 1631 having a read channel 1633, microcontroller 1637, and a memory 1635 interconnected for motor control, and actuator control to read and write disk 1621 from a read write head (not shown). Storage 1611 is connected by an IDE or other suitable coupling 1641 to a computer printed circuit board or add-in card 1651. The card 1651 has a microprocessor 1653, memory 1655, DSP 1657 and modem 1659 interconnected to provide path diversity packets from and to a connector 1661.

Figure 17:
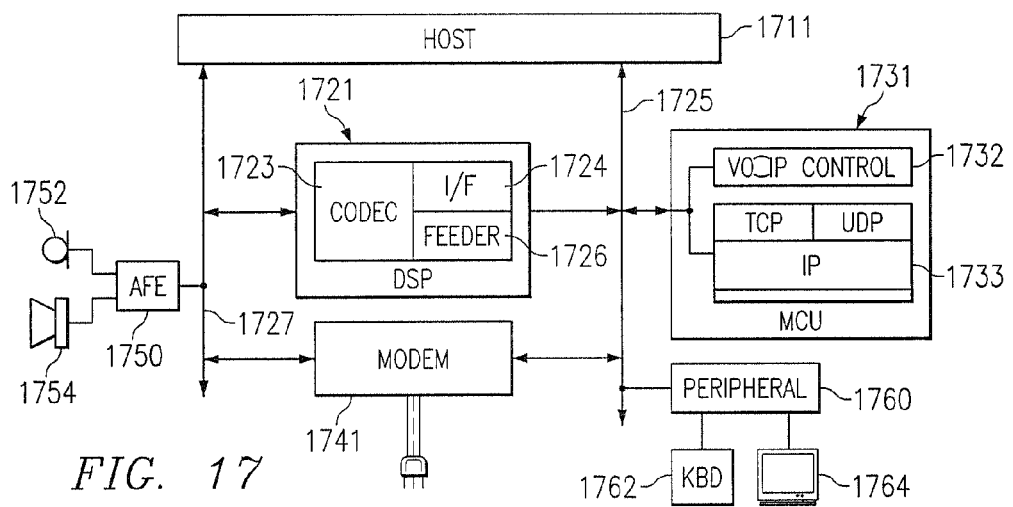
FIG. 17 is a block diagram of a chipset embodiment including improved integrated circuits having improved software partitioned among the integrated circuits.

In FIG. 17, partitioning of a chipset is shown. The chipset has a digital signal processor (DSP) integrated circuit 1721 and a microcontroller (MCU) integrated circuit 1731. The chipset further has partitioned between the DSP 1721 and the MCU 1731 the blocks of FIGS. 4 and 5 in one embodiment and the blocks of FIG. 26 in a second chipset embodiment. DSP 1721 has speech encoder/decoder codec 1723, a packet network path diversity interface block 1724, and a packet network path diversity feeder block 1726.

Some embodiments add memory and a control program for prestoring and playing coded speech to augment or even replace the speech codec in some appliances and talking toys that speak for themselves in normal operation or during maintenance. MCU 1731 has a VoIP control 1731 and a TCP/UDP/IP packet network protocol stack 1733 which together establish two or more software objects respectively representing diverse network connections, and the interface block 1724 and feeder software block 1726 each coupling the speech encoder/decoder 1723 concurrently to the two or more software objects A,B, etc. of FIGS. 4, 5 and 26. Busses 1725 and 1727 couple a host computer 1711 to DSP 1721 and MCU 1731 and further couple all of them to a modem or Link/Physical Layer 1741, analog front end AFE to microphone and loudspeaker, and to peripheral coupling to touchpad KBD and display. In this way, advantageous media over packet with path diversity is accomplished in computers, IP phones, talking toys and home appliances such as refrigerators, microwave ovens, bread machines, blenders, coffee makers, laundry machines, dryers, sweepers, thermostat assemblies, light switches, lamps, fans, drape and window shade motor controls, surveillance equipment, traffic monitoring, clocks, radios, network cameras, televisions, digital telephone answering devices, air conditioners, furnaces and central air conditioning apparatus. These and other devices are suitably connected to a packet network wirelessly or via cable, telephone lines, power lines or otherwise for remotely located monitoring, control, user commands and maintenance.

FIG. 18 depicts a process embodiment for running in either a source host 103 of FIG. 1 or a FIG. 12 destination host 1131. Operations commence with BEGIN 1801 and proceed to a decision step 1806 to determine if a communications connection is desired. If not operations go to a RETURN 1811, and otherwise proceed on to a step 1816. In step 1816, a diversity flag is checked and a decision step 1826 determines whether the diversity flag is on or set. If diversity flag is not set, operations go to a RETURN 1821 (or alternatively, suitably go to step 1856 and open a single path connection). If diversity flag is on, then operations proceed to a step 1831 to send a request to proxy ID list server 151 (or 815) for proxy pairs identification information. Next in a step 1841 the host receives the proxy pair identification information supplied back to host by the proxy ID list server 151 in response to the host request. When multiple pair identifiers are supplied, the host sifts the proxy pairs in a step 1846 according to any further criteria or conditions disclosed herein which the skilled worker elects to implement in the host and which criteria or conditions were not executed in the proxy ID list server 1835 prior to returning the multiple pair identifiers.

By this point, a pair of proxy identifiers has now been selected, identifying the proxies to be accessed. Next in FIG. 18, a step 1851 opens a connection to a first proxy A and then a step 1856 opens a connection to a second proxy B, as illustrated. It is contemplated that in either or both steps 1851 and 1856, that connections are opened to backup proxies among the sifted multiple pair identifiers if attempted connections to a first pair of proxies from sifting step 1846 fail to get connected.

After step 1856, operations then go on to an optional step 1861 to reset the diversity flag off. In this way, control software outside FIG. 18 in the host can deliberately again set the diversity flag on according to whether it is affirmatively desired, as for purposes of the copending incorporated patent application TI-28906.

Next in a step 1866, now that connections to proxies A and B are open, operations proceed to enable the codec 421 and interface software 441 of FIG. 4, and the feeder software 731 and decoder 741 of FIG. 5. Next, a step 1871 commences sending and receiving path diversity packets through the multiple software objects A, B, etc. respectively connected to proxies A, B, etc. Improvements as taught in the copending incorporated patent application TI-28906 suitably provide for changes in source rate, diversity rate, diversity type and otherwise as described therein, for example at or associated with step 1871.

A decision step 1876 determines whether one or both connections to proxy A, B, etc. are to be continued. Improvements as taught in the copending incorporated patent application TI-28906 suitably provide for changes in source rate, diversity rate, diversity type and otherwise as described therein, for example at or associated with steps 1871 and 1876. If a connection is to be continued, operations loop back to step 1871. If a connection is to be discontinued, then that connection is gracefully closed in a step 1881 whereupon operations in any remaining proxy or proxies continue by looping back to step 1871 for them. If communications are to be entirely discontinued, then step 1881 gracefully closes connections to all the proxies A, B, etc., and operations reach a RETURN 1886.

Among other things shown in FIG. 18 and described herein, is a process of sending a request for information identifying first and second proxies. Alternatively the process sends a request for information identifying a list of proxy candidates including the first and second proxies and processes or sifts the list of proxy candidates and selects first and second proxies. Operations open a first network path to a destination wherein the first network path has a first proxy computer, and open a second diverse network path to the same destination wherein the second network path has a second proxy computer. A sender computer generates first packets containing real-time information, and containing a first particular address of the destination, and containing a second particular address of the first proxy computer on the first network path intermediate the sender computer and the destination. Also the sender computer generates dependent packets containing information dependent on the real-time information, containing the first particular address of the destination, and containing a third particular address of the second proxy computer on the second diverse network path intermediate said sender computer and the destination. The sender computer thereupon sends the first packets and the dependent packets concurrently or close in time consecutively. The first packets are in one type of embodiment identical to the dependent packets.

Put in a somewhat different way, a process embodiment type sends to a receiver computer packets of real-time information at a sender computer via a network that has at least two routers. The process operates the sender computer to send requests to two or more of the routers to establish at least one common destination for the at least two routers of packets from the sender computer. A destination or receiver computer then receives packets of the real-time information from the same one source or sender computer at the receiver computer from the two or more of the routers to which requests were sent. The process at the receiver processes the packets from said two or more of said routers to reduce the number of lost packets compared to receiving the packets from only one of said routers.

Since a path diversity packet communication process suitably alternatively has the receiver open the connections, another process of receiving packets of real-time information has a receiver computer connected to a network that has packets originated from a source, the packets being replicated and the packets then sent to multiple destinations through at least two routers. In the receiver computer the process operates to send requests to two or more of said routers to establish the receiver computer as a destination for said at least two routers of packets from the same one source, and then receives packets of the real-time information from the same one source at the receiver computer from the two or more of said routers to which requests were sent. The packets from the two or more of the routers are processed to reduce the number of lost packets compared to receiving the packets from only one of the routers.

Another type of inventive embodiment is comprised by an information storage article of manufacture that has a storage medium holding physical variations representing bits of stored information about proxies and an identification process that identifies upon request at least two of the proxies for packet network path diversity using the stored information. The storage article is suitably implemented in various advantageous forms for particular purposes as a nonvolatile integrated circuit memory, a "floppy" diskette, an optically accessible medium such as compact disk like CD-ROM (read only memory), a hard disk drive with rigid disk magnetic storage, a storage area network (SAN) or other storage known to the art or yet to be devised.

FIG. 19 provides a flow chart of operations of list servers 151 and 815 of respective FIGS. 1, 8 and 18. In FIG. 19, operations commence with a BEGIN 1901 and go to a step 1911 to input a request for service from a requester computer such as any of computers 103, 105, 181, 189, 183, 187, 191, 193, 811, 813, 817, 1041, 1111, 1131, and 2600 depicted in FIGS. 1, 8, 10, 11, 12, and 26.

Next in FIG. 19, operations go from input step 1911 to a step 1921 to execute an identification process that identifies in response to the request of step 1911, at least two proxies for packet network path diversity using stored information about the proxies. Various solution embodiments for accomplishing this important function are described in more detail in connection with FIGS. 20, 21, 22, 23, 24 and 25. Then in a step 1931 the pairs of acceptable proxies identified in step 1921 are sifted by any of various alternative process criteria, such as proxy bandwidth, proxy distance from source or destination, random selection or no sifting at all. When there is no sifting, or partial sifting, then the rest of the sifting is performed in step 1846 in FIG. 18 in the requestor computer to which the unsifted or partially sifted pair identifiers are returned by the list server operating the process of FIG. 19.

Further in FIG. 19, operations go from step 1931 to a step 1941 to output the proxy identifiers thus selected, and send them to the requestor computer which receives them in FIG. 18 step 1841. Then a decision step 1951 determines whether the services of the list server for requesters are completed and thus if the process should stop. If stop, then operations reach a RETURN 1961, and otherwise they loop back to input step 1911.

In FIG. 20 a search table has column entries for Proxy Addresses, other Proxy Identifiers corresponding to the proxy addresses, Region such as geographic region or network region in which proxy is located, Location Coordinates sufficiently precise to geographically locate the position of the proxy, as by latitude and longitude, Service Provider identification such as company owning the proxy, CoS Class of Service levels and other CoS information for each proxy, URL (Uniform Resource Locator) digits and any other proxy descriptors relevant to a determination of path diversity in FIG. 19.

Note that the search table of FIG. 20 is suitably implemented as a 2-dimensional array, or an array with dimensions corresponding to each of the columns shown in FIG. 20. Further, various access processes are suitably used, such as a relational database supporting accesses and sorts according to any of various query criteria described herein or yet to be devised. For example, sorting the search table of FIG. 20 by region produces a Region Table 2571 of FIG. 25.

Figure 21:
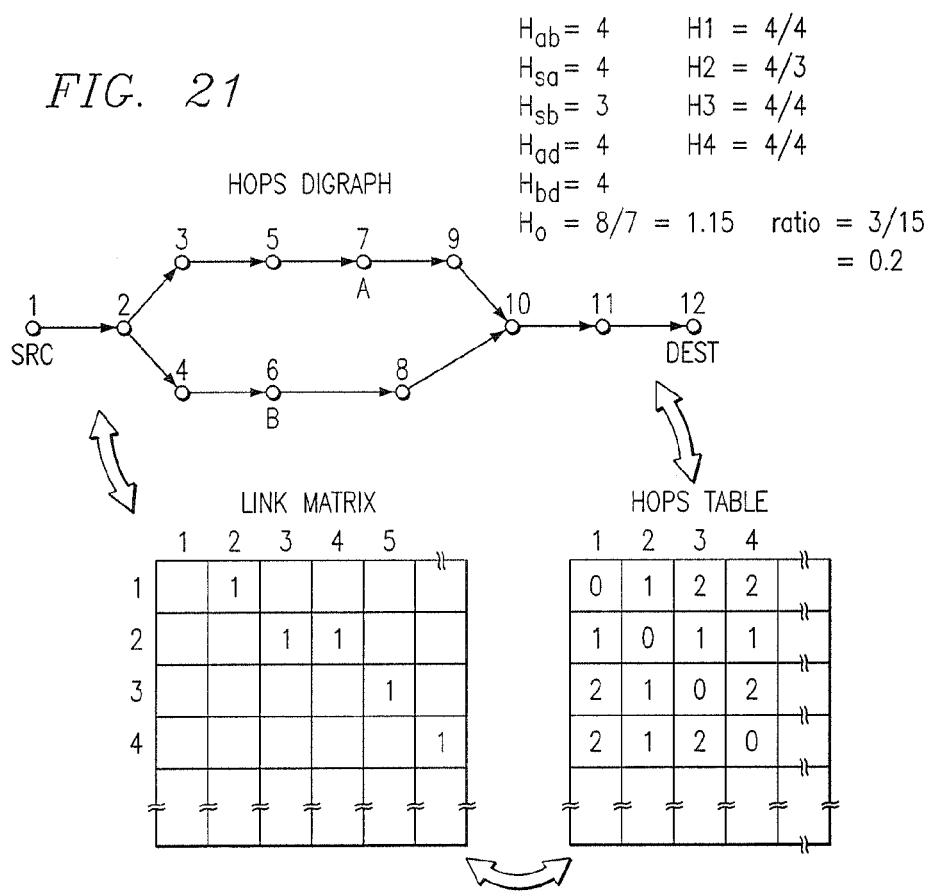
FIG. 21 is a diagram depicting interrelated data structures called Hops Digraph, Link Matrix and Hops Table for use in processing by an improved list server to respond to a requestor computer and supply proxy identification for packet network path diversity.
Figure 27:
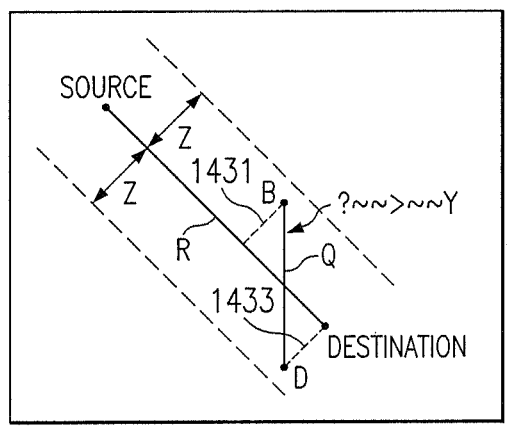
FIG. 27 is a geographic distance table for pairs of proxies with an associated geometric diagram which the table describes, for packet network path diversity communication.

Considering further the operations of the proxy list server 151 of FIGS. 1 and 815 in FIGS. 8 and 18, the tabular information of FIGS. 20, 21 and 27 in a first procedure is suitably obtained by network administrators or ISP administrators gathering that information about all their own proxies and/or many of the VoIP/VOP/media-over-packet proxies in the network. Then that information is loaded into the proxy list server 151 and/or 815.

In a second procedure, the tabular information of FIGS. 20, 21 and 27 is obtained by an automated process programmed by network administrators or ISP administrators. The automated process gathers and regularly updates that information about all or many of the VoP/VoIP/media-over-packet proxies in the network. That information is either generated in the proxy list server 151, and/or 815 or automatically transferred to the proxy list server from a machine that is executing the automated process, whereupon proxy list server is ready for service to hosts like 811 and 817 connected to the network. Multiple proxy list servers are suitably distributed around the network and maintained by one or more individual ISPs in a still further improvement.

Turning to the subject of search processes, in one version of the search table step 1921 of FIG. 19, the search uses the table of proxy descriptors of FIG. 20 and selects at least one pair of proxies that have different descriptors which is a good indication of path diversity.

In another version of the search table step 1921 of FIG. 19, the search uses location information about different proxies as entered in the table of proxy descriptors of FIG. 20. The search selects at least one pair of proxies by computing a distance between proxies from the location information. Then if the distance lies within a range (e.g. greater than 200 kilometers for diversity and less than 5000 kilometers to somewhat control path delay), then the pair of proxies is an acceptable pair. The distance is computed straightforwardly by geometry. For example, if the coordinates are Cartesian (x,y) coordinates, the distance is the square root of the sum of the squares of the differences between the two proxies' x-coordinates and the two proxies' y-coordinates. If the coordinates are in latitude and longitude, the distance is suitably computed according to a spherical trigonometry formula as the length of the shorter arc of a great circle joining the locations of the two proxies, where the radius of the great circle is the radius of the earth (about 4000 miles or about 6400 kilometers).

FIG. 21 shows interrelated network topology representations herein called Hops Digraph 2111, Link Matrix 2121, and Hops Table 2131. As indicated by double arrows, each representation is closely related to the others. FIG. 1 network 100 is a complicated arrangement of nodes and links, collectively regarded as its topology without regard to geographic location of the nodes. The Hops Digraph 2111 is a visual representation useful for display on a GUI graphical user interface coupled to step 1921 and associated with the list server 151 and/or 815 for development tools or operator supervisory use. The Hops Table 2131 is an example of a table of distances that provides network distances as least number of hops between proxies in the Hops Digraph 2111. For example the number of hops between nodes 1 and 3 is two (2) as indicated in row one, column three of the Hops Table 2131.

The FIG. 21 Link Matrix 2121 is a type of a table of distances for purposes herein that represents network distances as a matrix of entries to indicate presence or absence of a network link between a given pair of network nodes free of any intermediate network node between the given pair. Here the entries are suitably as simple as zero (0) and one (1). Notice that the Link Matrix "one" entries are embedded in the Hops Table 2131. Given the Link Matrix 2121, the Hops Table 2131 can be derived by a traversing algorithm that simply counts up numbers of "ones" in Link Matrix 2121 according to various paths. For even further network information, the "ones" in Link Matrix 2121 are replaced with, or supplemented by, time delay values describing the delay in each hop.

Given a source and a destination, another form of search step 1921 searches the Link Matrix 2121 entries for different network paths between the source and destination. For instance at least one pair of suitable paths are selected depending on a search condition depending on number of path nodes in common. One type of search condition specifies one pair of paths are selected which has a ratio H5 of a first number of path nodes (or links) in common divided by a sum of the nodes (or links) in each path wherein the ratio is less than a predetermined amount. This is an example wherein at least one pair of paths are selected based on a first number depending on links shared by the paths divided by a second number depending on the number of links in at least one of the paths. Another part of the search process suitably compares numbers of links or hops in the paths of each possible pair, and selects at least one pair of paths which have about the same number of links in each. Where the table provides network distances including numbers of hops Hsa from source-to-proxyA, Hsb from source-to-proxyB, Had from proxyA-to-destination, and Hbd from proxyB-to-destination, then the search includes a search in a range of values of a path-length ratio H0=(Hsa+Had)/(Hsb+Hbd), wherein the range includes unity.

When a pair of paths is found, as illustrated in the illustrated Hops Digraph 2111 for a portion of network 100, at least one proxy A for media over packet purposes in a first path is identified from proxy information of FIG. 20, and at least one proxy B for media over packet purposes in a second path is identified from proxy information. Then proxy A and proxy B as thus identified constitute a selected proxy pair for path diversity purposes.

In another version of the search table step 1921 of FIG. 19, the search uses Hops Table 2131 as a table of distances that provides network distances including a first number of hops between a pair of proxies, and given a second number of hops between one of the proxies and the source. The search condition provides at least that acceptable proxies are ones wherein the first number divided by the second number exceeds a predetermined amount.

In a yet more complex version of the just mentioned approach, the search uses Hops Table 2131 as a table of distances that provides network distances including numbers of hops from source-to-proxyA, from source-to-proxyB, from proxyA-to-proxyB, from proxyA-to-destination, and from proxyB-to-destination, and the search condition at least provides inequalities on a set of ratios H1, H2, H3, H4. Ratio H1 is a ratio of the number of hops Hab from proxyA-to-proxyB to the number of hops Hsa from source to proxyA. H2 is the ratio of the number of hops Hab from proxyA-to-proxyB to the number of hops Hsb from source to proxy B. H3 is the ratio of the number of hops Hab from proxyA-to-proxyB to the number of hops Had from proxy A to destination. H4 is the ratio of the number of hops Hab from proxyA-to-proxyB to the number of hops Hbd from proxy B to destination. The inequalities are that H1, H2, H3, H4 are respectively greater than respective predetermined constants. All the constants are suitably set to two (2) and adjustments and iterations made relative to those values.

In the simple example of FIG. 21, Hab=4, Hsa=4, Hsb=3, Had=4, Hbd=4. H0=8/7, H1=4/4, H2=4/3, H3=4/4, H4=4/4. H5=3/(8+7)=3/15.

Figure 22:
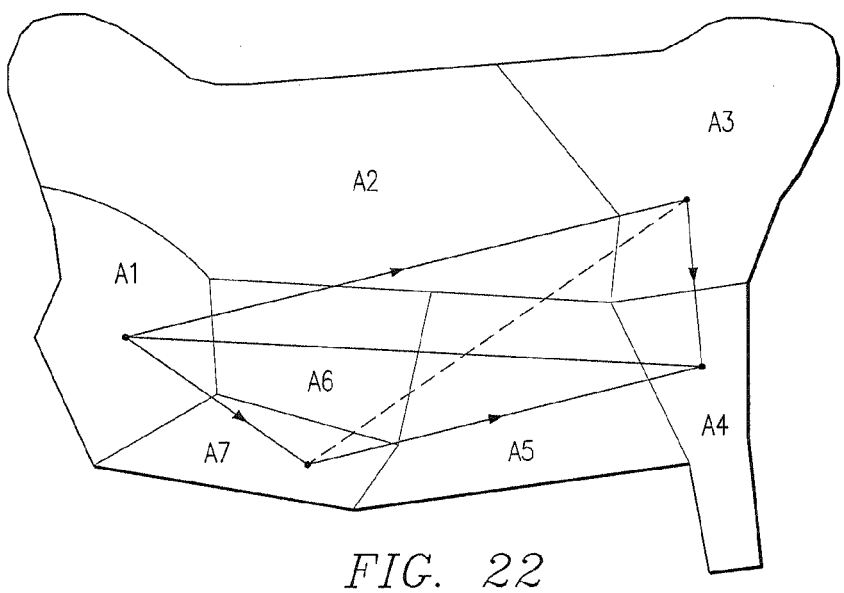
FIG. 22 is a region diagram depicting packet network path diversity communication as described herein.

FIG. 22 depicts North America divided into geographic area regions A1, A2, ... A7. A source computer in region A1 is communicating with a destination computer in region A4. The connection uses path diversity via a proxy in region A3 and another proxy in region A7. Thus, two path diverse paths A1-A3-A4 and A1-A7-A4 are advantageously set up for high QoS communication between the source and destination.

Figure 23:
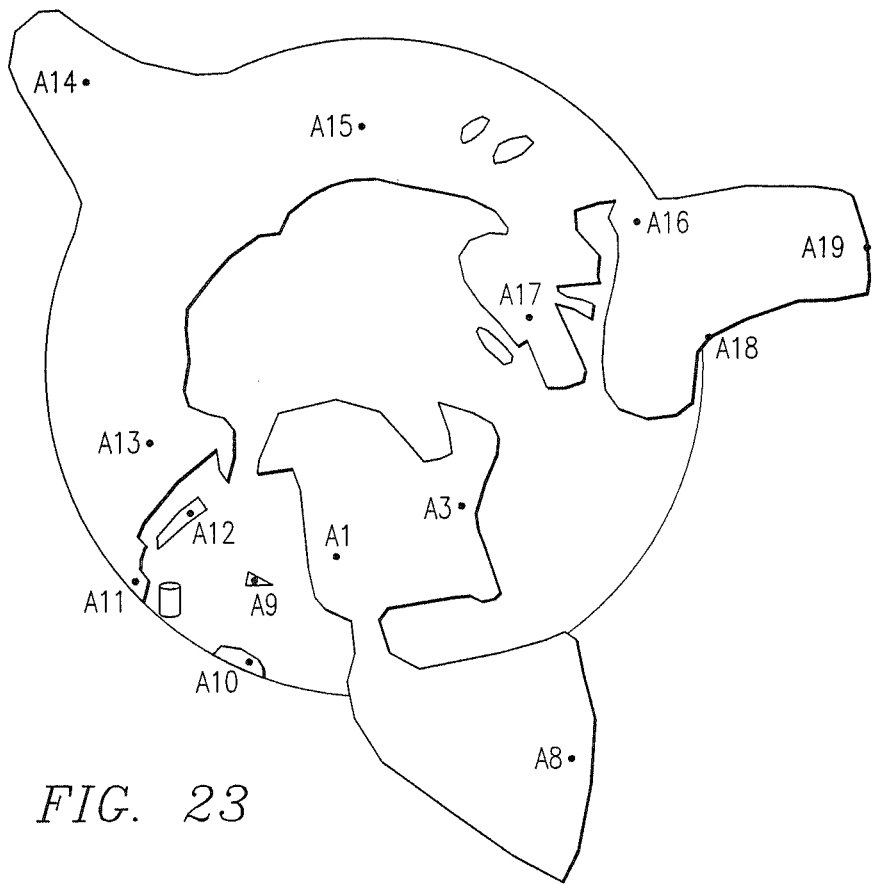
FIG. 23 is a map projection of the world centered on the north pole, for depicting packet network path diversity communication as described herein.

FIG. 23 depicts the planet Earth divided into geographic area regions A1 through A19 with dots provided to suggest some major cities included in the regions. Considering networks from a global point of view for Internet, enterprise and other networks further enlightens the process embodiments. Various process embodiments are generated by considering geographic regions, computing distances with the spherical surface geometry of the planet in mind, considering coastal and national boundaries, and various implications of these for path diversity. Where computers on orbiting satellites or computers elsewhere in space are part of the packet network, three dimensional volume regions and three dimensional distance calculations suitably are provided.

A first list generation process sections a geographic region like a country or a world region or the entire world into a number of different numbered areas. Given a location of source host 811, the list generation process identifies the numbered area in which destination 817 lies. From the destination area number, the list generation process then selects a pair of proxies A and B prestored in server 151 and/or 815.

A second list generation process similarly sections a world region into a number of different numbered areas. Given a location of source host 811, the list generation process identifies the numbered area in which destination 817 lies. From the destination area number, the second list generation process then accesses a first prestored list of recommended proxies any of which host 811 may select to be its proxy A. Also, from the destination area number, the second list generation process further accesses a second prestored list of recommended proxies any of which host 811 may select to be its proxy B.

A third list generation process similarly sections a world region into a number of different numbered areas. A prestored Region Table lists all the proxies in Region 1, all the proxies in Region 2, etc. Given a location of source host 811, the list generation process identifies the number of a region Rs in which the source lies, and also the numbered region Rd in which destination 817 lies. From the source and destination region numbers, the third list generation process then identifies two different regions Ra and Rb other than the source and destination regions. These two different regions are suitably between the source and destination regions and laterally displaced from a line joining the source and destination regions. Now that regions Ra and Rb are identified, the process accesses the Region Table and provides a first prestored list of recommended proxies in Region Ra, any of which proxies host 811 may select to be its proxy A. Further, the process accesses the Region Table and provides a second prestored list of recommended proxies in Region Rb, any of which proxies host 811 may select to be its proxy B.

One uncomplicated embodiment advantageously is free of using information about the position of source host 811 and destination host 817. Here a table as in FIG. 27 has distances between proxies. A selection process embodiment elegantly picks pairs of proxies that are more than a given distance (e.g. 200 km) apart. Thus, it would pick proxy pairs (A,E), (A,C) and (B,D). Any of these proxy pairs are so far apart that path diversity is virtually certain to occur when the source sends two dependent packet streams through the respective proxies in a given one of the pairs. Correlations r between the proxies are suitably also entered in the table along with, or even instead of, the geographic distances, as discussed earlier hereinabove.

Figure 24:
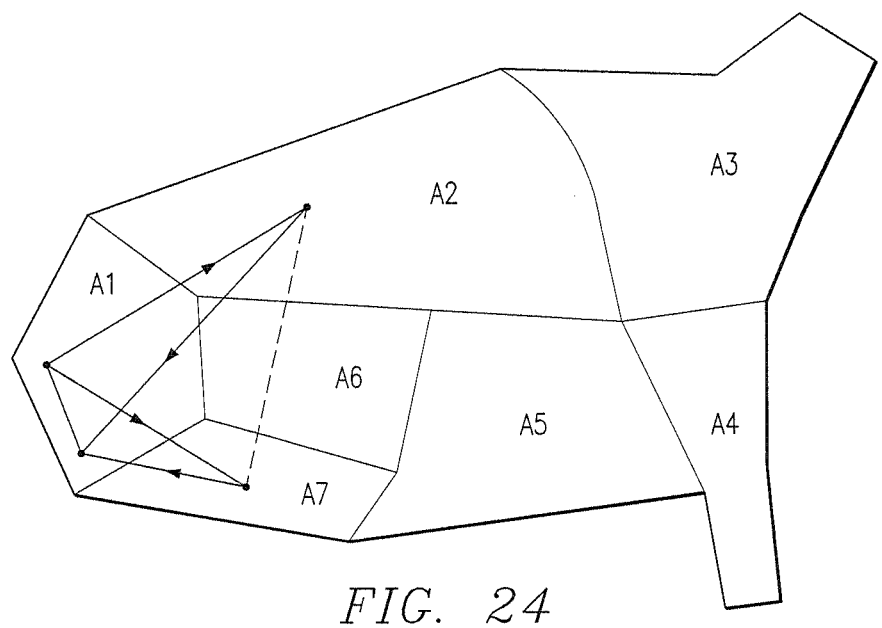
FIG. 24 is a region diagram depicting packet network path diversity communication as described herein.

An identification process discussed in connection with FIGS. 24 and 25 is responsive to a request, provides a table of distances between proxies, executes a search in the table of distances for one or more acceptable proxy pairs according to a search condition, and selects at least one pair of acceptable proxies. The search condition suitably provides at least that proxies be more than a predetermined geographic distance apart such as 200 kilometers or more. Further, given a line between a source computer and a destination computer, the search condition provides that acceptable proxies lie on opposite sides of the line. Each proxy has a perpendicular distance to the line, and the search condition suitably further provides at least that respective distances from acceptable proxies to the line lie in a predetermined zone width but more than a predetermined distance from the line. Considering only the line segment between the source and destination, the search condition suitably also provides that acceptable proxies are ones located such that there are respective perpendiculars from the acceptable proxies that intersect the line segment itself. This keeps the proxies from lying too far afield.

FIG. 27 illustrates a process embodiment to identify two (or three or desired number of) appropriate proxies for path diversity communications in a packet network. Proxy list server 815 holds a table of geographic distances Q illustrated as a two dimensional array with rows and columns for proxies A, B, C, D, E, F, . . . in the packet network. For example, in FIG. 27 two proxies B and D are separated by straight-line distance Q. A source, typified by host 811. is joined by a line segment R to a destination, such as host 817. Proxy list server 815 executes a search algorithm which selects from the tabulated data a list X of all acceptable proxy pairs which satisfy a set of conditions, as examples.

Condition 1 specifies that each acceptable pair of proxies have a distance Q between them that exceeds a predetermined value Y. Value Y suitably is large enough to virtually guarantee path diversity in the network and not so large as might introduce unnecessary path delay. Value Y suitably lies in a range of 200 kilometers to 2000 kilometers. One example of value Y is suitably 300 kilometers, or about 200 miles.

Condition 2: Note further that each proxy has a perpendicular distance to line R. For example, in FIG. 27, proxies B and D have distances 1431 and 1433 respectively to the line R. Condition 2 specifies that a pair of proxies like (B,D) is acceptable for list X provided they lie on opposite sides of line R and the respective distances (1431. 1433) from the proxies to the line R are both less than or equal to a predetermined zone width Z and both greater than a predetermined distance Z1 from line R. Zone width Z is suitably less than 300 km, for one example. and distance Z1 is suitably at least 50 kilometers and less than zone width Z.

Condition 3 introduces a further condition relating the proxy location to the source location and destination location, so that the proxy location is not too far afield of line segment R. Condition 3 specifies that line segment R be intersected by respective perpendiculars from proxies B and D. In other words, the perpendiculars do not intersect the extended line beyond the line segment R.

Condition 4: Based on particular information available to the skilled worker, values of Y which are less than 200 km and greater than 2000 km may also turn out to be quite suitable, and when such is the case, their use is contemplated herein as well. For example, quite satisfactory path-diversity results by routing path-diverse packets and dependent packets through paths operated by different long haul service providers (e.g., MCI and AT&T independent fiber networks) wherein these paths are even physically next to one another. Thus, distance Q between proxies is not a sole defining criterion of the more important goal: path diversity. Accordingly, maintain proxy descriptor entries such as network service provider corresponding to each proxy and DIFFSERV class of service CoS provided, or other service descriptor. Condition 4 then specifies that if any of conditions 1, 2 and 3 are not met, that a proxy pair is still acceptable if they have diverse machine descriptor entries in FIG. 20.

Condition 5: Network topology conditions are herein defined to specify which pairs of proxies will provide path diversity. Here, use descriptors such as numbers of hops from source-to-proxyA, from source-to-proxyB, from proxyA-to-proxyB, from proxyA-to-destination, and from proxyB-to-destination. For example, a path diversity criterion suitably establishes inequalities on a set of ratios H1, H2, H3, H4. Ratio H1 is the ratio of the number of hops Hab from proxyA-to-proxyB to the number of hops Hsa from source to proxy A. H2 is the ratio of the number of hops Hab from proxyA-to-proxyB to the number of hops Hsb from source to proxy B. H3 is the ratio of the number of hops Hab from proxyA-to-proxyB to the number of hops Had from proxy A to destination. H4 is the ratio of the number of hops Hab from proxyA-to-proxyB to the number of hops Hbd from proxy B to destination. Then the inequalities are that H1>2, H2>2, H3>2, H4>2. In other words the hops between proxies A and B should be sufficiently great compared to the source-to-proxy hops and proxy-to-destination hops. The thresholds for the ratios are established individually and suitably lie in a range of 0.5 to 5, by way of an example range. Next a path-length ratio H0 is kept close to unity (e.g. in an example range 0.7 to 1.3) to avoid path latency differences. Ratio H0, for example, is determined as the ratio of the sum of hops from source-to-proxyA plus hops from proxyA-to-destination divided by the sum of hops from source-to-proxyB plus hops from proxyB-to-destination. In mathematics, this ratio is $$H0=(Hsa+Had)/(Hsb+Hbd).$$

A second topological approach utilizes Link Matrix 2121 of ones and zeroes to indicate network links between nodes having identifiers 1,2,3, . . . that also identify each row and identify each column. Zero entry means no link, and "one" entry means presence of a link between the network node of the entry's column and a different network node corresponding to the entry's row. The algorithm then searches the matrix for different paths between source and destination. Some of these paths will have many nodes in common. Other paths will have that a number of nodes in common being less than some threshold of commonality as a ratio H5 of all the nodes in the paths. Then pairs of paths are selected by an automatic selection process program which have a low ratio of nodes in common to the sum of the nodes in both paths in the pair. So this ratio is made less than one-tenth ({fraction (1/10)}) for example. Again, the constraint that path-length ratio H0 be close to unity is introduced to further sift the path selections. Next, the automatic selection process identifies a node on each path that has a VoIP proxy implemented as described herein so that specifying each VoIP proxy node allows for path diversity herein.

Other conditions than those described may be used, and none of the conditions is necessarily required.

When path diversity is set up via an even number M of proxies, then M/2 (half of M) multiple distinct pairs of proxies from the list X are selected, none of the pairs having a proxy in common with any other selected pair. When path diversity is set up via an odd number M of proxies (three or more), then (M+1)/2 multiple distinct pairs of proxies from the list X are selected, with one of the pairs having a proxy in common with one other selected pair.

In FIG. 25, more process embodiments for selecting regions for path diverse communications are described next. In one type of such embodiments the identification process is responsive to a request including a destination area, and includes the steps of selecting the at least two proxies from a prestored list of proxies by geographic region providing path diversity relative to the destination area.

In FIG. 25, list server operations commence with a BEGIN 2501 and proceed to a step 2511 to input a request for service including requestor identification and source and destination identification and location information. Next in a step 2521, the regions are determined in which the source 811 and destination 817 lie, if this information was not given as such in the request at input step 2511. These locations or regions are sometimes determinable from the IP address or from postal Zip Code information describing the source and destination machines. See, for example, a website www.report.com. Then in a step 2531, a line (or great circle) between source and destination is computed from their locations, or generally midway through their regions. Next in a step 2541, for each region in the world or multi-region portion thereof, one or more parameters are computed relative to the line between source and destination.

The process provides a prestored region table 2571 that identifies the proxies located in respective regions. From respective source and destination regions, or first and second regions identified in step 2521, the process then in a step 2551 identifies third and fourth regions other than the first and second regions, wherein the third and fourth regions are displaced from the line joining the source and destination regions, as indicated by the parameter for example.

In a step 2561, the region table 2571 for the third region is accessed to provide at least one identifier of a proxy in the third region, e.g., proxy identifier "4R" in FIG. 25. Also, in a step 2561, the region table for the fourth region is accessed and provides at least one identifier of a proxy in the fourth region, e.g., proxy identifier "N3" in FIG. 25. (Third and fourth regions are distinguished for process description terminology purposes here, and are not meant to be limited to areas A3 and A4 as those were used in FIGS. 22 and 23.)

The process of FIG. 25 thus executes step 2561 access to region table 2571 to respond with proxy identifiers for a first one of the at least two proxies from a first prestored list of proxies in a first geographic region and responds with proxy identifiers for a second one of the at least two proxies from a second prestored list of proxies in a second geographic region.

Then in a step 2581 each pair of selected proxy identifiers such as (4R,N3) is output to the sender computer. Or in a more complex system, the pair is output to a requestor computer which then relays them to the sender computer for use as in FIG. 18.

A decision step 2591 determines whether the request-servicing process of FIG. 25 is to stop. If so, operations reach a RETURN 2595, and otherwise operations loop back to step 2511 to input and service more requests for proxy pairs.

Figure 26:
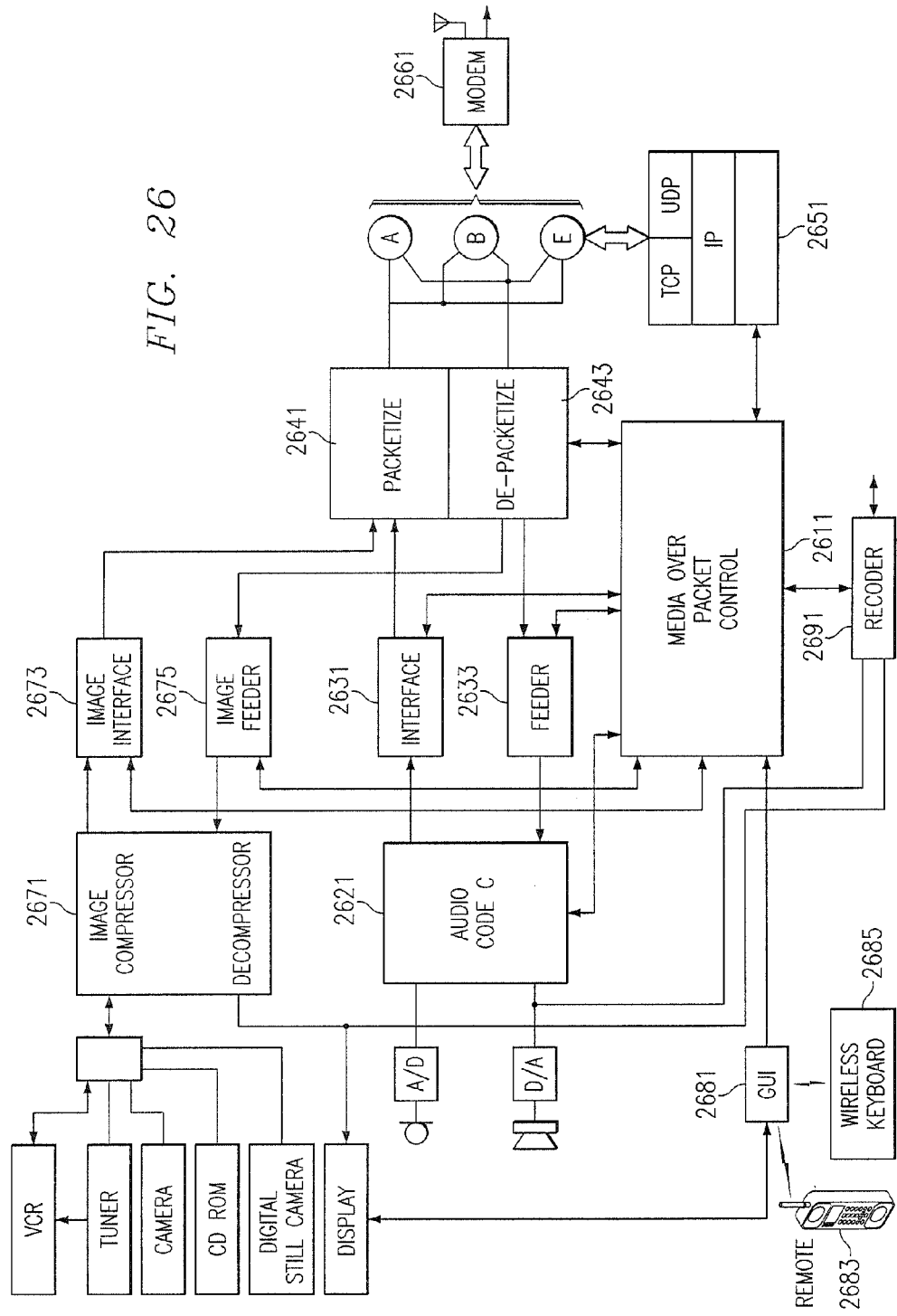
FIG. 26 is a partially-block and partially-process diagram of another form of image/audio/real-time media over packet sending and receiving software embodiment of the invention for installation in an improved workstation, personal computer, notebook computer, palmtop computer, computer card, VoIP cellular telephone, and other computer embodiments of the invention.

FIG. 26 depicts a media over packet computer system having packet network path diversity packet transmission and reception of both speech/audio and image real-time information. A media over packet control block 2611 is interconnected with speech codec and/or audio codec 2621, an interface software block 2631, a feeder reception software block 2633, a packetize block 2641, depacketize block 2643, a TCP/UDP/IP stack 2651, an image compressor/decompressor 2671, an image interface block 2673, and an image feeder block 2675.

A microphone and A/D circuit supply speech/audio codec 2621 with sampled audio information. Speech/audio codec 2621 supplies frames via path diversity dependent packet interface 2631 and to packetize block 2641 which couples to multiple software objects A, B, . . . E connecting via a block 2661 to two or more network path diverse proxies A, B, . . . E. Block 2661 is any kind of modem or any device that has a link layer and/or physical layer for communication purposes.

Various image sources supply image data via a control interface CTRL I/F to video compressor and/or image compressor 2671. The image sources include a television Tuner, a VCR video tape recorder and player, a video camera, a CD-ROM drive having images on it, a digital still camera, the output of a medical image processing computer such as a CAT (computer aided tomography) scanner, PET (positron emission tomography) scanner, MRI (magnetic resonance imaging) scanner or other image processing computer (not shown).

In an architecturally elegant and similar way to the audio blocks above, image compressor 2671 supplies frames via path diversity dependent image packet interface 2673 and to packetize block 2641 which couples to multiple software objects A, B, . . . E connecting via the modem 2661 to two or more network path diverse proxies A, B, . . . E. Real time data such as from a medical monitor or industrial process control (not shown) are suitably coupled analogously into the transmit path in packets and dependent packets coupled to the software objects A, B, . . . E for transmission by the advantageous packet network path diversity.

In the receive direction multiple software objects A, B, . . . E receive packets from path diversity communication paths in network 100 and supply them to depacketize block 2643 coupled to feeder software 2633. Feeder software 2633 provides depacketized frames and dependent frame data to audio codec 2621 for decoding of frames for output through D/A converter and an audio output transducer such as a loudspeaker. Lost packet compensation in feeder software 2633 occurs by substituting dependent data from dependent packets for packets which either never arrived or arrived too late, or by coupling multiple mutually dependent data to codec 2621 for combining or other reconstruction.

In an architecturally elegant and similar way in the image path, the multiple software objects A, B, . . . E also receive image packets from path diversity communication paths in network 100 and supply them to depacketize block 2643 coupled to image feeder software 2675. Image feeder software 2675 provides image data and dependent image data to image decompression in block 2671 for decompression of image frames. Lost packet compensation in image feeder software 2675 also substitutes dependent image data from dependent image packets for image packets which either never arrived or arrived too late. Decompressed image frames are output to a Display system such as television or cathode ray tube monitor, or liquid crystal display, or digital micromirror display or digital light processing display, video recorder, image processing equipment, storage area network (SAN), or other image utilization systems.

The media over packet control 2611 is coupled to a GUI graphical user interface 2681 associated with the Display. The GUI 2681 is suitably controlled by an infrared or Bluetooth wireless link from a remote 2683, from a wireless or wired keyboard 2685, and/or from a wearable communication and control device.

Real time data such as from a medical monitor or industrial process control are suitably coupled from network 100 via software objects A, B, . . . E analogously into the receive path in packets and dependent packets and feeder software used for lost packet compensation to improve QoS and coupling to a medical and/or industrial information processing and display.

In gateway, wireless base station, and other applications a recoder 2691 is suitably enabled by media over packet control 2611. Image information decompressed by block 2671 and audio information decoded by audio codec 2621 are both coupled to the recoder 2691. Recoder 2691 then recodes or transcodes the information and produces an output compressed and coded according to a different form than was received by system 2600. It is contemplated that systems such as those shown in FIGS. 4 and 5 as well as system 2600 of FIG. 26 are suitably cascaded and integrated for various telecommunication and networking purposes. Where many channels are processed simultaneously, the systems are suitably replicated or multiplexed to the extent desired, so that software and hardware are effectively, efficiently and economically employed.

Where blocks are shown herein, they are suitably implemented in hardware, firmware or software in any combination.

The embodiments described are merely illustrative, while the scope of the inventive subject matter is defined by the claims and equivalents thereof.

What is claimed is:

1. A single-chip integrated circuit comprising:
   a processor circuit; and
   a packet network path diversity software stack that includes a process of sending real-time information including:
   generating on the integrated circuit first packets containing the real-time information, and containing a first particular address of the destination, and containing a second particular address of a first proxy computer;
   generating dependent packets containing information dependent on the real-time information, containing the first particular address of the destination, and containing a third particular address of a second proxy computer; and
   sending the first packets and the dependent packets.

2. The single-chip integrated circuit of claim 1 including a speech encoder coupled to the packet network path diversity software stack.

3. The single-chip integrated circuit of claim 2 wherein the speech encoder produces frames of encoded speech and the integrated circuit including a packetizer responsive to the frames to output packets including at least one of the frames in a packet.

4. The single-chip integrated circuit of claim 1 wherein the processor circuit includes a digital signal processor multiplier and arithmetic logic unit.

5. The single-chip integrated circuit of claim 1 including a non-volatile memory storing instructions establishing the packet network path diversity software stack for execution by the processor circuit.

6. The single-chip integrated circuit of claim 1 including a speech encoder and wherein the packet network path diversity software stack includes an interface block and a networking block establishing two or more software objects respectively representing diverse network connections, the interface block coupling the speech encoder concurrently to the two or more software objects.

7. The single-chip integrated circuit of claim 1 including a voice over packet control coupled to the packet network path diversity software stack.

8. The single-chip integrated circuit of claim 1 including a feeder software block coupled to the two or more software objects.

9. The single-chip integrated circuit of claim 8 including a decoder coupled to the feeder software block for receiving packets of real time information and dependent packets.

* * * * *